(12) United States Patent
Dombrowski

(10) Patent No.: US 10,980,162 B1
(45) Date of Patent: Apr. 20, 2021

(54) LIFTING AID FOR A LONG-HANDLED IMPLEMENT

(71) Applicant: Stephen E. Dombrowski, Midland, MI (US)

(72) Inventor: Stephen E. Dombrowski, Midland, MI (US)

( * ) Notice: Subject to any disclaimer, the term of this patent is extended or adjusted under 35 U.S.C. 154(b) by 0 days.

(21) Appl. No.: 16/731,018

(22) Filed: Dec. 30, 2019

(51) Int. Cl.
*A01B 1/02* (2006.01)
*E01H 5/02* (2006.01)

(52) U.S. Cl.
CPC .............. *A01B 1/028* (2013.01); *E01H 5/02* (2013.01)

(58) Field of Classification Search
CPC .............. A01B 1/028; A01B 1/16; E01H 5/02
USPC ..................... 254/131.5; 56/400.14
See application file for complete search history.

(56) References Cited

U.S. PATENT DOCUMENTS

| | | |
|---|---|---|
| 568,962 A | 10/1896 | Skeels |
| 738,057 A | 9/1903 | O'Connor |
| 803,142 A | 10/1905 | Ward |
| 1,296,738 A | 3/1919 | Bekke |
| 2,269,119 A | 1/1942 | Mason |
| 2,441,449 A | 5/1948 | Shaw |
| 2,470,217 A | 5/1949 | McLoughlin |
| 2,769,612 A | 11/1956 | Weisheit |
| 2,846,785 A | 8/1958 | Underwood |
| 3,035,816 A | 5/1962 | Conant |
| 4,461,458 A | 7/1984 | Poulin |
| D275,928 S | 10/1984 | LoPresti |
| 4,531,713 A | 7/1985 | Balboni |
| 4,722,512 A | 2/1988 | Lighthizer |
| 4,881,332 A | 11/1989 | Evertsen |
| 5,054,278 A | 10/1991 | Thorndike |
| 5,137,317 A | 8/1992 | Bieniek |
| 5,271,169 A | 12/1993 | Konsztowicz |
| 5,345,635 A | 9/1994 | Morgan |
| 5,487,530 A | 1/1996 | McCullough |
| 5,669,651 A | 9/1997 | Vroegindewey |
| 5,732,933 A | 3/1998 | Champi |
| 5,863,084 A | 1/1999 | Krug |
| 5,918,921 A | 7/1999 | Samuelson |

(Continued)

FOREIGN PATENT DOCUMENTS

| | | | |
|---|---|---|---|
| DE | 642839 | * | 3/1937 |
| DE | 804138 C | | 4/1951 |

(Continued)

*Primary Examiner* — Gary S Hartmann
(74) *Attorney, Agent, or Firm* — Inventech Patent Services, LLC; Marc A. Scharich

(57) ABSTRACT

A lifting aid for a long-handled implement includes a mounting assembly configured to be attached to an elongated portion of a long-handled implement and a fulcrum assembly pivotally attached to the mounting assembly. The fulcrum assembly includes a fulcrum bar pivotally attached to the mounting assembly and at least one skid shield operably coupled to the fulcrum bar such that (i) at least a bottom portion of the at least one skid shield is disposed adjacent to a lowermost part of a lower end portion of the fulcrum bar and (ii) at least a lower part of the bottom portion of the at least one skid shield is capable of moving, at least in a substantially linear manner, upwardly above the lowermost part of the lower end portion of the fulcrum bar and downwardly below the lowermost part of the lower end portion of the fulcrum bar.

20 Claims, 27 Drawing Sheets

(56) References Cited

U.S. PATENT DOCUMENTS

| | | |
|---|---|---|
| 6,086,049 A | 7/2000 | Sheils |
| 6,203,081 B1 | 3/2001 | Kegan, Sr. |
| 6,237,975 B1 | 5/2001 | Drobot |
| 6,371,542 B1 | 4/2002 | Hasbani |
| 6,485,076 B1 | 11/2002 | Chang |
| 6,663,085 B1 | 12/2003 | Dalon |
| 6,922,920 B1 | 8/2005 | Stratz |
| 7,052,058 B2 | 5/2006 | Olinski |
| 7,111,418 B2 | 9/2006 | Noonan |
| D546,144 S | 7/2007 | Noonan et al. |
| 7,631,443 B2 | 12/2009 | Noonan et al. |
| 7,681,932 B2 | 3/2010 | Chang |
| 8,136,268 B2 | 3/2012 | Noonan |
| 8,182,007 B2 | 5/2012 | Fisher |
| 8,240,069 B2 | 8/2012 | Adinata |
| 9,204,587 B2 | 12/2015 | Cordeiro |
| 9,366,003 B1 | 6/2016 | Stenzel et al. |
| 9,402,337 B2 | 8/2016 | Al-Taweel |
| 9,469,952 B2 | 10/2016 | Quinn et al. |
| 9,834,897 B2 | 12/2017 | Adams |
| 9,909,273 B2 | 3/2018 | Al Adawi |
| 10,106,941 B1 | 10/2018 | Nam |
| 10,842,062 B1 | 11/2020 | Rosenshine |
| 2006/0214443 A1 | 9/2006 | Dixon |
| 2008/0012369 A1 | 1/2008 | Helton |
| 2009/0235559 A1 | 9/2009 | Coles |
| 2010/0327614 A1 | 12/2010 | Bush |
| 2012/0025551 A1 | 2/2012 | Janosky |
| 2012/0137548 A1 | 6/2012 | Kimball |
| 2014/0132015 A1 | 5/2014 | Stachowski |
| 2015/0195985 A1 | 7/2015 | Gershman |
| 2015/0282418 A1 | 10/2015 | Al-Taweel |
| 2016/0242351 A1 | 8/2016 | Richmond |

FOREIGN PATENT DOCUMENTS

| | | | |
|---|---|---|---|
| DE | 842413 | * | 6/1952 |
| EP | 3129558 B1 | | 11/2019 |
| GB | 659100 A | | 10/1951 |
| GB | 2435636 A | | 9/2007 |
| WO | 1992017049 A1 | | 10/1992 |
| WO | 2006119656 A1 | | 11/2006 |
| WO | 2011140420 A1 | | 11/2011 |

\* cited by examiner

LIFTING AID FOR A LONG-HANDLED IMPLEMENT

TECHNICAL FIELD

The present disclosure relates generally to long-handled implements and, more particularly, to a lifting aid for a long-handled implement.

BACKGROUND

Long-handled implements, such as various shovels, spades, pitchforks and the like, are often utilized to perform a variety of tasks (e.g., relating to snow removal, home improvement projects, construction, excavating, landscaping, farming, etc.). The utilization of such long-handled implements, while typically generally useful and beneficial, still often presents some challenges and limitations to users. For example, as a result of shoveling snow with a snow shovel or digging into soil or stone with a spade, many users have been known to experience fatigue or even more serious health-related issues (e.g., back pain, joint pain, heart attacks, strokes, etc.). Such health-related issues may be especially linked to certain actions of users, such as continually bending over and lifting or prying the loaded snow shovel or spade generally upwardly so as to throw, push or otherwise displace the snow, soil, stone, etc. to a desired location.

In an attempt to assist users with moving, lifting or prying long-handled implements, some moving or lifting aids for long-handled implements have been developed, but often with relatively complicated designs, relatively bulky and/or heavy components (e.g., large frame structures supported on large or small wheels, etc.) or with components which compel users to still bend over or perform other various laborious maneuvers.

With at least the aforementioned challenges and limitations in mind, there is a continuing unaddressed need for a lifting aid for a long-handled implement which is at least relatively simple in design and relatively light weight, which may be used on various types of long-handled implements, which is at least relatively simple to use, which at least enables a user to bend over less and keep a straighter posture while using a long-handled implement and which at least enables a user to gain additional leverage while using a long-handled implement, such as while shoveling snow with a snow shovel or digging into soil or stone with a spade, thus making it easier for the user to lift or pry the loaded snow shovel or spade generally upwardly so as to throw, push or otherwise displace the snow, soil, stone, etc. to a desired location.

SUMMARY

At least the above-identified need is addressed with the present disclosure. One aspect of the present disclosure is directed to a lifting aid for a long-handled implement. The lifting aid includes a mounting assembly configured to be attached to an elongated portion of a long-handled implement. Additionally, the lifting aid further includes a fulcrum assembly pivotally attached to the mounting assembly. The fulcrum assembly includes a fulcrum bar having an upper end portion, a lower end portion disposed opposite the upper end portion and an intermediate portion disposed between the upper and lower end portions. The fulcrum bar further has a longitudinal centerline thereof extending through at least the upper end portion, the intermediate portion and the lower end portion of the fulcrum bar. The fulcrum bar is pivotally attached to the mounting assembly proximate the upper end portion of the fulcrum bar. The fulcrum assembly further includes at least one skid shield. The at least one skid shield is operably coupled to the fulcrum bar, proximate the lower end portion of the fulcrum bar, such that (i) at least a bottom portion of the at least one skid shield is disposed adjacent to a lowermost part of the lower end portion of the fulcrum bar and (ii) at least a lower part of the bottom portion of the at least one skid shield is capable of moving, at least in a substantially linear manner, upwardly above the lowermost part of the lower end portion of the fulcrum bar and downwardly below the lowermost part of the lower end portion of the fulcrum bar.

Another aspect of the present disclosure is directed to a lifting aid for a long-handled implement. The lifting aid includes a mounting assembly configured to be attached to an elongated portion of a long-handled implement. Additionally, the lifting aid further includes a fulcrum assembly pivotally attached to the mounting assembly. The fulcrum assembly includes a fulcrum bar having an upper end portion, a lower end portion disposed opposite the upper end portion and an intermediate portion disposed between the upper and lower end portions. The fulcrum bar further has a longitudinal centerline thereof extending through at least the upper end portion, the intermediate portion and the lower end portion of the fulcrum bar. The fulcrum bar is pivotally attached to the mounting assembly proximate the upper end portion of the fulcrum bar. The fulcrum assembly further includes a skid shield. The skid shield has an opening formed therein which extends completely through at least a bottom portion of the skid shield. The skid shield is operably coupled to the fulcrum bar, proximate the lower end portion of the fulcrum bar, such that (i) the longitudinal centerline of the fulcrum bar extends through at least the opening formed in the skid shield, (ii) at least a lowermost part of the lower end portion of the fulcrum bar is capable of being disposed within the opening formed in the skid shield and (iii) at least a lower part of the bottom portion of the skid shield is capable of moving, at least along the longitudinal centerline of the fulcrum bar, upwardly and downwardly with respect to at least the lower end portion of the fulcrum bar.

Yet another aspect of the present disclosure is directed to a lifting aid for a long-handled implement. The lifting aid includes a mounting assembly configured to be attached to an elongated portion of a long-handled implement. Additionally, the lifting aid further includes a fulcrum assembly pivotally attached to the mounting assembly. The fulcrum assembly includes a fulcrum bar having an upper end portion, a lower end portion disposed opposite the upper end portion and an intermediate portion disposed between the upper and lower end portions. The fulcrum bar further has a longitudinal centerline thereof extending through at least the upper end portion, the intermediate portion and the lower end portion of the fulcrum bar. The fulcrum bar is pivotally attached to the mounting assembly proximate the upper end portion of the fulcrum bar. The fulcrum assembly further includes a flexible member. The flexible member has an upper end portion, a lower end portion disposed opposite the upper end portion of the flexible member and an intermediate portion disposed between the upper and lower end portions of the flexible member. The lower end portion of the flexible member is attached to the fulcrum bar proximate the intermediate portion of the fulcrum bar or proximate the lower end portion of the fulcrum bar. The upper end portion of the flexible member is capable of being grasped and moved by a user so as to pivot the fulcrum bar with respect to at least the mounting assembly.

Yet another aspect of the present disclosure is directed to a lifting aid for a long-handled implement. The lifting aid includes a mounting assembly configured to be attached to an elongated portion of a long-handled implement. The mounting assembly includes a first mounting bracket having a first engagement portion configured to engage the elongated portion of the long-handled implement. The mounting assembly further includes a second mounting bracket having a second engagement portion configured to engage the elongated portion of the long-handled implement. The first and second mounting brackets are each further configured to be operably connected to each other such that the first and second engagement portions of the respective first and second mounting brackets are capable of being clamped against the elongated portion of the long-handled implement so as to attach the mounting assembly to the elongated portion of the long-handled implement. Additionally, the lifting aid further includes a fulcrum assembly pivotally attached to the mounting assembly. The fulcrum assembly includes a fulcrum bar having an upper end portion, a lower end portion disposed opposite the upper end portion and an intermediate portion disposed between the upper and lower end portions. The fulcrum bar further has a longitudinal centerline thereof extending through at least the upper end portion, the intermediate portion and the lower end portion of the fulcrum bar. The fulcrum bar is pivotally attached to the mounting assembly proximate the upper end portion of the fulcrum bar. The mounting assembly of the lifting aid further includes a stop capable of being contacted by the fulcrum assembly. The stop is configured to prevent the fulcrum assembly from pivoting, with respect to at least the mounting assembly, in a first rotational direction when the fulcrum assembly contacts the stop.

Yet another aspect of the present disclosure is directed to a lifting aid for a long-handled implement. The lifting aid includes a mounting assembly configured to be attached to an elongated portion of a long-handled implement. The mounting assembly includes a first mounting bracket having a first engagement portion configured to engage the elongated portion of the long-handled implement. The mounting assembly further includes a second mounting bracket having a second engagement portion configured to engage the elongated portion of the long-handled implement. The first and second mounting brackets are each further configured to be operably connected to each other such that the first and second engagement portions of the respective first and second mounting brackets are capable of being clamped against the elongated portion of the long-handled implement so as to attach the mounting assembly to the elongated portion of the long-handled implement. Additionally, the lifting aid further includes a fulcrum assembly pivotally attached to the mounting assembly. The fulcrum assembly includes a fulcrum bar having an upper end portion, a lower end portion disposed opposite the upper end portion and an intermediate portion disposed between the upper and lower end portions. The fulcrum bar further has a longitudinal centerline thereof extending through at least the upper end portion, the intermediate portion and the lower end portion of the fulcrum bar. The fulcrum bar is pivotally attached to the mounting assembly proximate the upper end portion of the fulcrum bar. The fulcrum assembly further includes a flexible member. The flexible member has an upper end portion, a lower end portion disposed opposite the upper end portion of the flexible member and an intermediate portion disposed between the upper and lower end portions of the flexible member. The lower end portion of the flexible member is attached to the fulcrum bar proximate the intermediate portion of the fulcrum bar or proximate the lower end portion of the fulcrum bar. The upper end portion of the flexible member is capable of being grasped and moved by a user so as to pivot the fulcrum bar with respect to at least the mounting assembly.

BRIEF DESCRIPTION OF THE DRAWINGS

One or more exemplary embodiments of the present disclosure are pointed out with particularity in the appended claims. However, other features of the one or more embodiments will become more apparent and will be best understood by referring to the following detailed description in conjunction with the accompanying drawings, wherein:

DETAILED DESCRIPTION

As required, one or more detailed embodiments of the present disclosure are disclosed herein, however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Furthermore, the use of a singular term, such as, "a" is not to be interpreted as limiting the number of components or details of particular components. Additionally, various terms and/or phrases describing or indicating a position or directional reference such as, but not limited to, "top", "bottom", "front", "rear", "forward", "rearward", "end", "outer", "inner", "left", "right", "vertical", "horizontal", "upper", "lower", etc. may relate to one or more particular components as seen generally from a user's vantage point during use or operation, and such terms and/or phrases are not to be interpreted as limiting, but merely as a representative basis for describing the present disclosure to one skilled in the art.

Referring generally to the figures, exemplary lifting aids 100, 1000 for long-handled implements, such as respective exemplary long-handled implements 400, 4000, are collectively shown and will be further described herein.

Referring to at least FIGS. 1A-10B, the lifting aid 100 and the long-handled implement 400 are shown. As shown in at least FIGS. 2C and 9-10B, the long-handled implement 400 may be a long-handled shovel (e.g., a long-handled snow shovel), however, the long-handled implement 400 may be any type of long-handled implement such as, but not limited to, various types of long-handled spades, landscaping tools, pitchforks, crowbars/pry bars, etc., as may be understood by one skilled in the art.

Figure 1A:
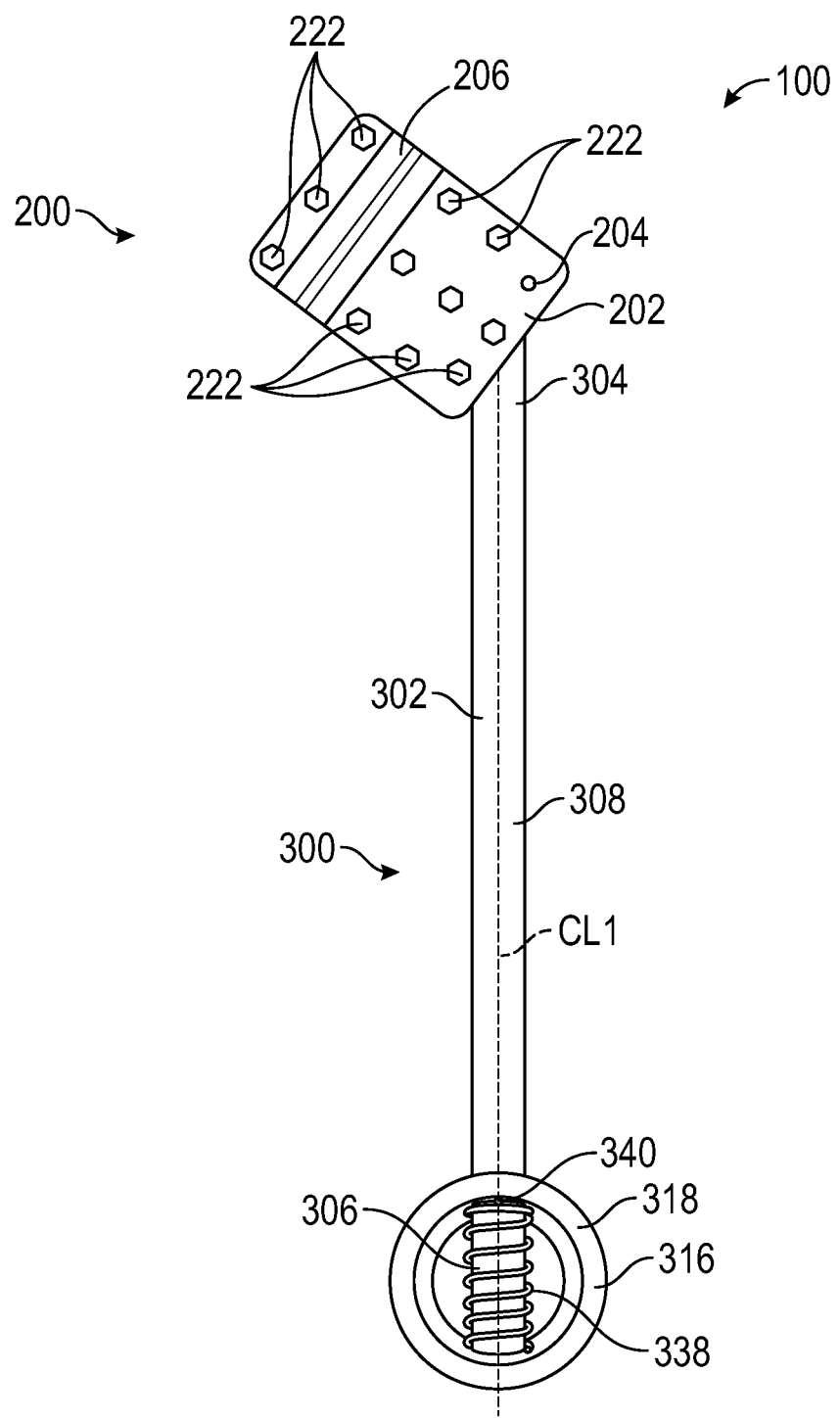
FIG. 1A is a left-side view of an exemplary lifting aid for a long-handled implement.
Figure 1B:
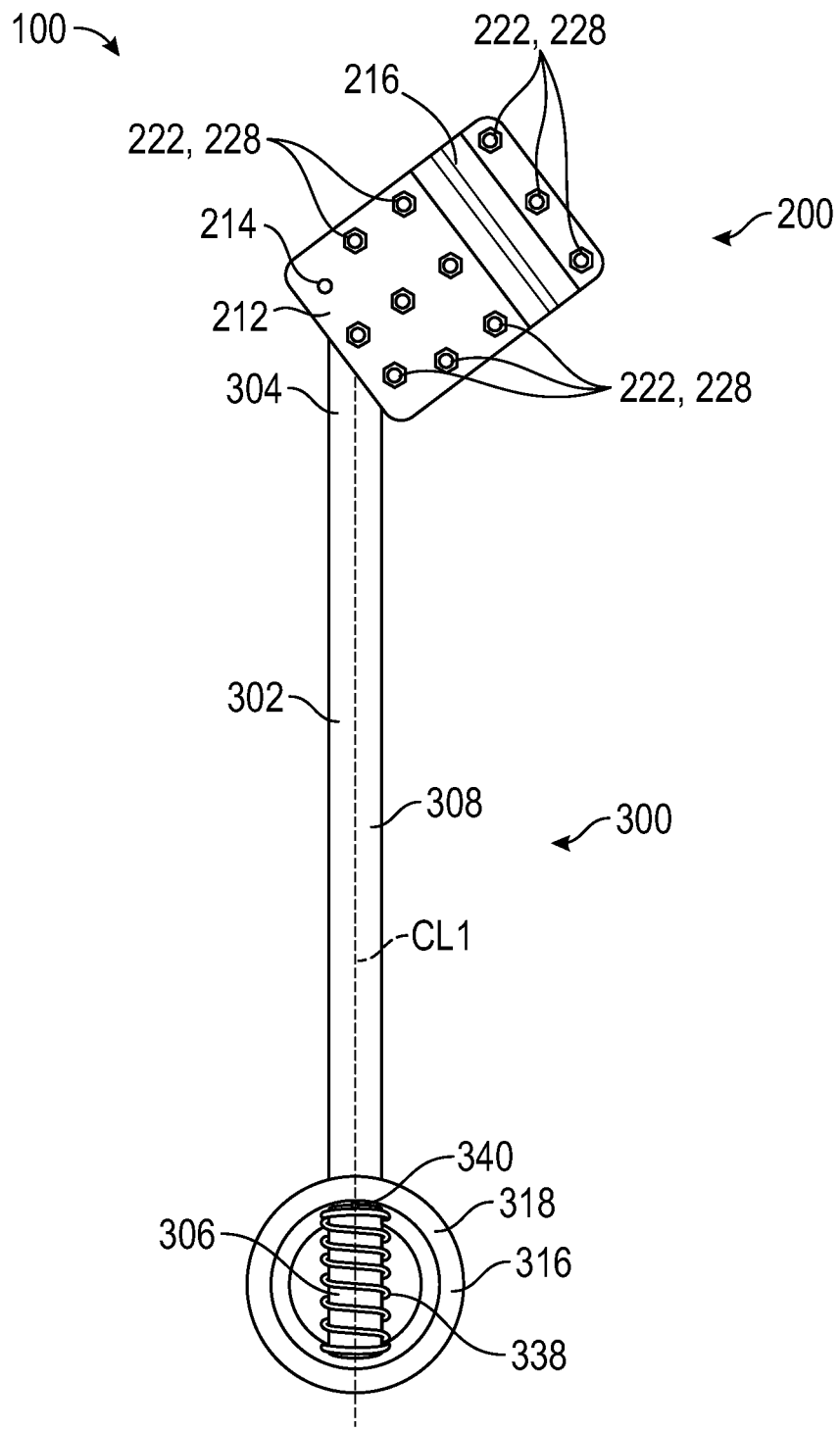
FIG. 1B is a right-side view of the lifting aid shown in FIG. 1A.

As shown in at least FIGS. 1A and 1B, the lifting aid 100 may include a mounting assembly 200 which may be attached to an elongated portion 402 (e.g., a portion of a handle and/or a shaft) of the long-handled implement 400, as will be further described herein. The lifting aid 100 may further include a fulcrum assembly 300 which may be pivotally attached to the mounting assembly 200, as will also be further described herein.

Referring to at least FIGS. 1A, 1B, 2A-2C and 9-10B, the mounting assembly 200 of the lifting aid 100 will now be described in further detail. The mounting assembly 200 may include a first mounting bracket 202 which may have a first plurality of openings 204 formed therein. The first mounting bracket 202 may further have a first engagement portion 206 which may be suitably shaped and sized so as to be capable of engaging the elongated portion 402 of the long-handled implement 400. The first engagement portion 206 may include one or more anti-slip surfaces 208 (e.g., provided by gritted anti-slip adhesive tape or other anti-slip elements) disposed on an inner surface 210 of the first engagement portion 206, as will be further described herein. The mounting assembly 200 may further include a second mounting bracket 212 which may have a second plurality of openings 214 formed therein. The second mounting bracket 212 may further have a second engagement portion 216 which may be suitably shaped and sized so as to be capable of engaging the elongated portion 402 of the long-handled implement 400. The second engagement portion 216 may include one or more anti-slip surfaces 218 (e.g., provided by gritted anti-slip adhesive tape or other anti-slip elements) disposed on an inner surface 220 of the second engagement portion 216, as will be further described herein.

Figure 2A:
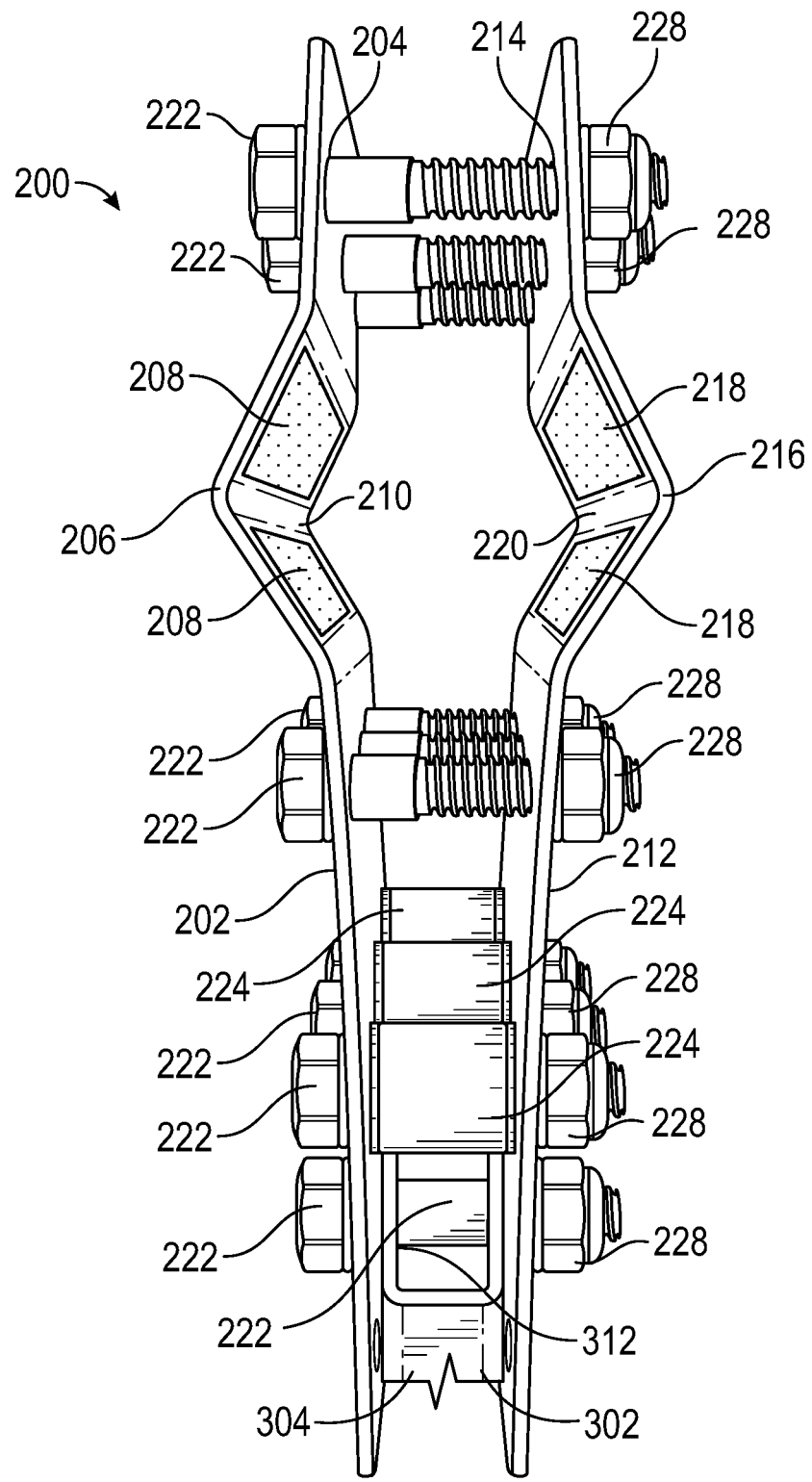
FIG. 2A is a top view of an exemplary mounting assembly of the lifting aid shown in at least FIGS. 1A and 1B.
Figure 2B:
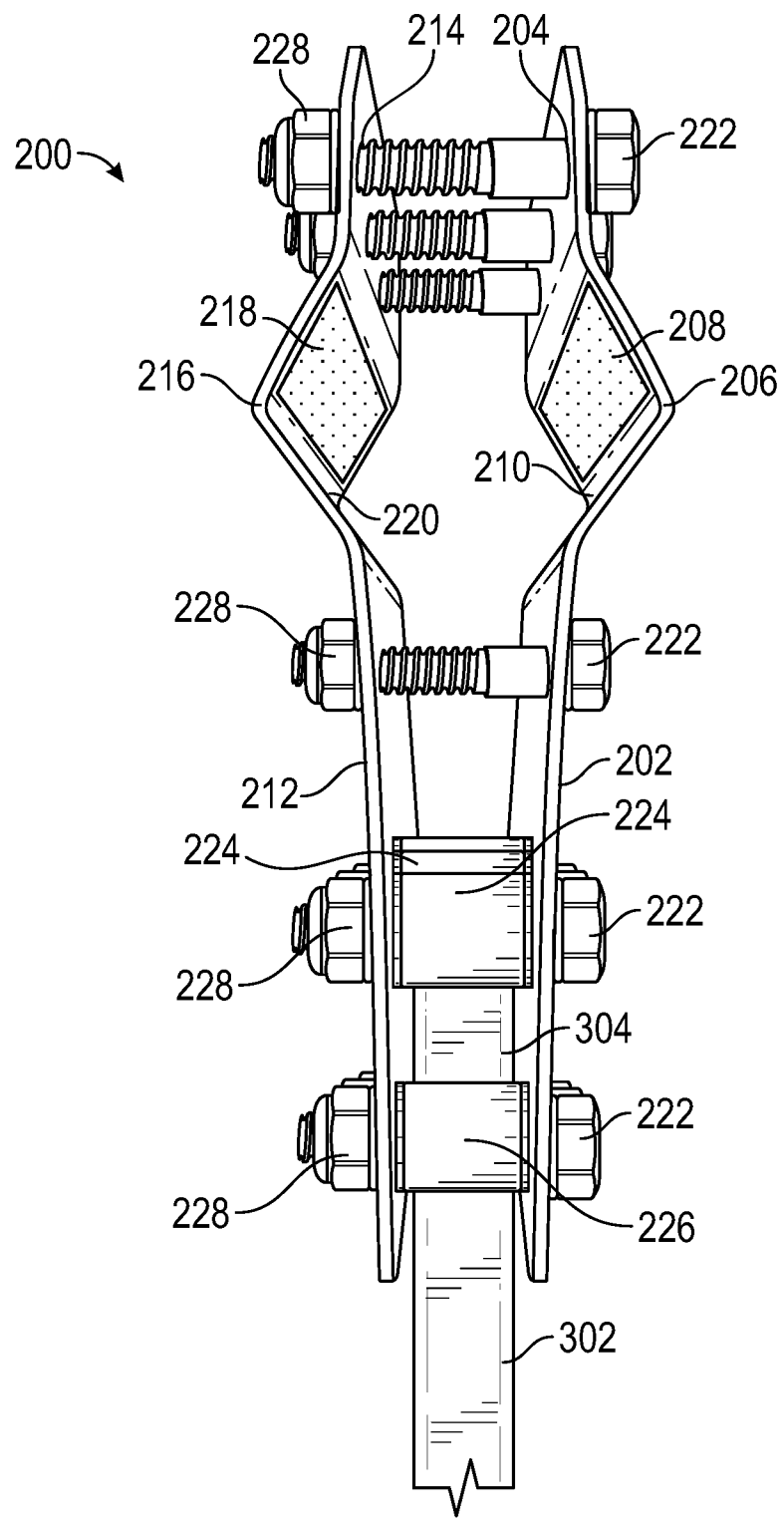
FIG. 2B is a bottom view of the mounting assembly shown in at least FIG. 2A.
Figure 2C:
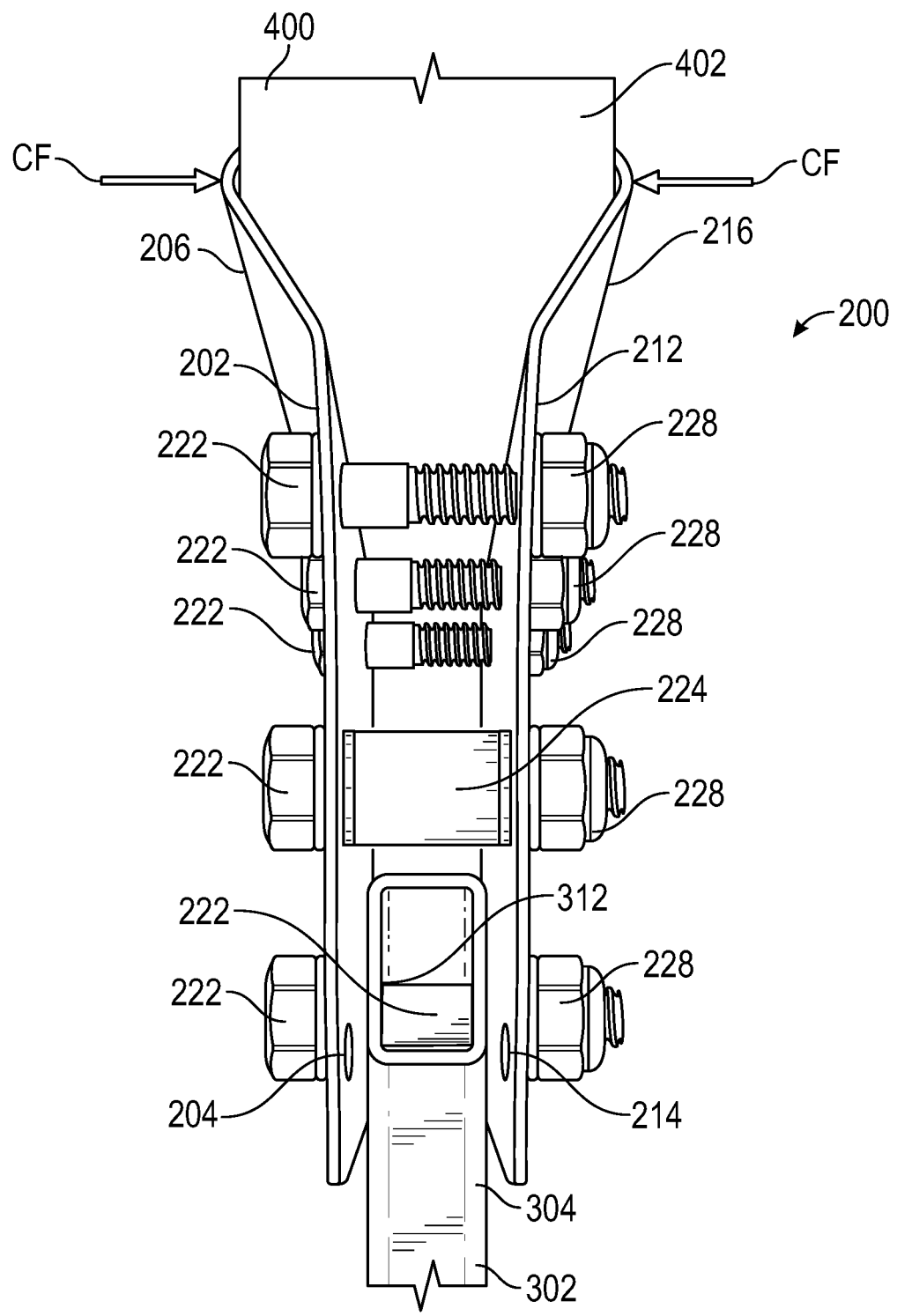
FIG. 2C is a top-rear view of the mounting assembly shown in at least FIGS. 2A and 2B, illustrating the mounting assembly attached to an elongated portion of an exemplary long-handled implement.

As shown in at least FIGS. 1A and 1B, and particularly in FIGS. 2A-2C, the mounting assembly 200 may further include a plurality of fasteners 222, such as bolts or other suitable fasteners. Each of the plurality of fasteners 222 may extend through respective openings of the first and second plurality of openings 204, 214 formed in the respective first and second mounting brackets 202, 212. As shown particularly in FIGS. 2A and 2C, one of the plurality of fasteners 222 (e.g., the rearmost center fastener 222) may additionally extend through the fulcrum assembly 300 so as to pivotally attach the fulcrum assembly 300 to the mounting assembly 200, as will be further described herein. Furthermore, as shown particularly in FIGS. 2A-2C, some of the plurality of fasteners 222 may additionally extend through a respective plurality of spacers 224 (e.g., generally cylindrical spacers made from nylon, metal or other strong and durable material) disposed between the first and second mounting brackets 202, 212. As further shown particularly in FIGS. 2A-2C, when the plurality of fasteners 222 which extend through the plurality of spacers 224 are securely fastened, as will be further described herein, the plurality of spacers 224 may be collectively capable of at least advantageously providing structural support and rigidity between the first and second mounting brackets 202, 212, especially in a general area, defined between the first and second mounting brackets 202, 212, where the plurality of spacers 224 are disposed and where the fulcrum assembly 300 may be pivotally attached to the mounting assembly 200. In this regard, each of the plurality of spacers 224 may be substantially the same size and may further advantageously space the first and second mounting brackets 202, 212 apart from each other at a substantially consistent, suitable distance to permit at least part of the fulcrum assembly 300 to be disposed between the first and second mounting brackets 202, 212, especially in the general area, defined between the first and second mounting brackets 202, 212, where the plurality of spacers 224 are disposed and where the fulcrum assembly 300 may be pivotally attached to the mounting assembly 200.

As further shown in FIGS. 2A-2C, and as will be further described herein, one of the plurality of spacers 224 may additionally function or otherwise serve as a stop 226 which is capable of being contacted by the fulcrum assembly 300 so as to prevent the fulcrum assembly 300 from further pivoting, with respect to at least the mounting assembly 200, in a first rotational direction RD1 when the fulcrum assembly 300 contacts the stop 226. Each of the plurality of fasteners 222 may be tightly or otherwise securely fastened (e.g., by at least a respective plurality of locknuts 228 being securely tightened on the plurality of fasteners 222). As such, with the plurality of fasteners 222 securely fastened, the plurality of fasteners 222 may operably connect the first and second mounting brackets 202, 212 to each other.

As shown particularly in FIG. 2C, with the elongated portion 402 of the long-handled implement 400 disposed between the first and second engagement portions 206, 216 of the respective first and second mounting brackets 202, 212, and with the plurality of fasteners 222 securely fastened, the plurality of fasteners 222 (e.g., especially the plurality of fasteners 222 which are disposed closest to the elongated portion 402 of the long-handled implement 400) may additionally provide a clamping force CF to at least the first and second engagement portions 206, 216 of the respective first and second mounting brackets 202, 212. In this regard, with the clamping force CF provided to at least the first and second engagement portions 206, 216 of the respective first and second mounting brackets 202, 212, the first and second engagement portions 206, 216 may be tightly, or otherwise securely clamped against the elongated portion 402 of the long-handled implement 400 so as to attach the mounting assembly 200 to the elongated portion 402 of the long-handled implement 400. In this regard, with the mounting assembly 200 attached to the elongated portion 402 of the long-handled implement 400, it is to be appreciated that the one or more anti-slip surfaces 208, 218, which may be disposed on the respective inner surfaces 210, 220 of the respective first and second engagement portions 206, 216 of the respective first and second mounting brackets 202, 212, may be securely clamped against, and thus may substantially contact, the elongated portion 402 of the long-handled implement 400 so as to further advantageously prevent the mounting assembly 200 from rotating and/or sliding easily, or at all, with respect to the elongated portion 402 of the long-handled implement 400.

Furthermore, as shown particularly in FIGS. 2A-2C, given that at least the plurality of spacers 224 may be disposed generally away and rearward from the first and second engagement portions 206, 216 of the respective first and second mounting brackets 202, 212, the general front area of the mounting assembly 200 where the first and second engagement portions 206, 216 are disposed may be relatively flexible and may therefore advantageously generally conform to different sizes and shapes (e.g., varying diameters and/or taper angles) of the elongated portion 402 of the long-handled implement 400, especially once the plurality of fasteners 222 which are disposed closest to the first and second engagement portions 206, 216, and thus closest to the elongated portion 402 of the long-handled implement 400, are securely fastened. In this regard, based on such factors as a desired mounting location (e.g., determined by a user), the mounting assembly 200 may be removably attached to the elongated portion 402 of the long-handled implement 400 at one of a plurality of different locations disposed along the elongated portion 402 of the long-handled implement 400, as may be understood by one skilled in the art. Alternatively, the mounting assembly 200 may be permanently attached to the elongated portion 402 of the long-handled implement 400 (e.g., at a fixed location). As a non-limiting example, some or all of the plurality of fasteners 222 may be permanent or otherwise non-removable (e.g., such as permanently secured rivets). As further non-limiting examples, the mounting assembly 200 may be permanently attached to the elongated portion 402 of the long-handled implement 400 by way of an adhesive, a manufacturing process such as welding or being formed as an integral part of the elongated portion 402 of the long-handled implement 400 (e.g., by way of an injection molding process or other manufacturing process), as may be understood by one skilled in the art.

Regarding overall construction of the mounting assembly 200, as a non-limiting example, at least the first and second mounting brackets 202, 212 may be made from any suitable material, including any suitable metal which is preferably strong and durable, such as steel, aluminum, alloys, etc., and which may be formed by stamping, casting, machining or other manufacturing process, as may be understood by one skilled in the art. As another non-limiting example, at least the first and second mounting brackets 202, 212 may be made from any suitable polymer which is preferably strong and durable, such as a glass-filled nylon, high-density polyethylene (HDPE), acrylonitrile butadiene styrene (ABS), etc., and which may be injection molded or formed by other manufacturing processes, as may be understood by one skilled in the art. Furthermore, as a non-limiting example, at least the first and/or second mounting brackets 202, 212 may include a plurality of reinforcement ribs (not shown) which may be integrally formed thereon, such as by way of an injection molding process or other manufacturing process, and may be capable of replacing the plurality of spacers 224 (e.g., as previously described herein) of the mounting assembly 200.

Referring to at least FIGS. 1A-10B, the fulcrum assembly 300 of the lifting aid 100 will now be described in further detail. The fulcrum assembly 300 may include a substantially elongated fulcrum bar 302. The fulcrum bar 302 has an upper end portion 304, a lower end portion 306 disposed opposite the upper end portion 304 and an intermediate portion 308 disposed between the upper and lower end portions 304, 306.

The fulcrum bar 302 further has a longitudinal centerline CL1 thereof extending through at least the upper end portion 304, the intermediate portion 308 and the lower end portion 306 of the fulcrum bar 302. As shown particularly in at least FIGS. 3A, 3B and 5B, the lower end portion 306 of the fulcrum bar 302 may have a generally flat bottom peripheral surface 310, which, in this example, is the lowermost part 310 of the lower end portion 306 of the fulcrum bar 302. While in this example the lowermost part 310 of the lower end portion 306 of the fulcrum bar 302 is shown to be generally flat, the lowermost part 310 may be jagged, pointed, generally curved, etc., depending on such factors as the cross-sectional shape of the fulcrum bar 302 and the particular configuration of the lower end portion 306 of the fulcrum bar 302, as may be understood by one skilled in the art. Furthermore, the fulcrum bar 302 may be a hollow bar, a solid bar or a combination of a hollow and solid bar. In the case where the fulcrum bar 302 is a hollow bar, a cap or plug (not shown) may be temporarily placed over at least the lowermost part 310 of the lower end portion 306 of the fulcrum bar 302 when the fulcrum bar 302 is to be contacting loose or soft ground surfaces (e.g., gravel, soft soil, sand, etc.) so as to keep the inside of the hollow bar free from undesired buildup or clogging. Additionally, the fulcrum bar 302 may be a single bar, a plurality of bars formed together or a plurality of bars operably connected to each other, as may be understood by one skilled in the art. Furthermore, as may be understood by one skilled in the art, the fulcrum bar 302 may have any suitable overall longitudinal length or lateral width (e.g., based on at least the particular long-handled implement on which the lifting aid 100 is to be employed, based on user preferences, etc.) and may have a cross-sectional shape which is rectangular, circular or of any other suitable shape.

Furthermore, as shown particularly in at least FIGS. 2A and 2C, the fulcrum bar 302 may further have at least one upper opening 312 formed therein, and extending therethrough, proximate the upper end portion 304 of the fulcrum bar 302.

Additionally, the fulcrum bar 302 may further have at least one lower opening 314 formed therein, and extending therethrough, proximate the lower end portion 306 of the fulcrum bar 302 (e.g., as shown particularly in at least FIGS. 4A and 4B), as will be further described herein. As shown particularly in at least FIGS. 1A, 1B and 2A-2C, the fulcrum bar 302 may be pivotally attached to the mounting assembly 200, proximate the upper end portion 304 of the fulcrum bar 302, by way of the one of the plurality of fasteners 222 (e.g., the rearmost center fastener 222) of the mounting assembly 200, as previously described herein, extending through the at least one upper opening 312 formed in the fulcrum bar 302 and being securely fastened. Alternatively, while not shown in the figures, a bushing (e.g., a generally cylindrical brass bushing or other suitable bushing) may be secured in, and extend through, the at least one upper opening 312 formed in the fulcrum bar 302. In this regard, the one of the plurality of fasteners 222 (e.g., the rearmost center fastener 222) of the mounting assembly 200 may extend through the bushing (not shown) and be securely fastened so as to pivotally attach the fulcrum bar 302 to the mounting assembly 200, as may be understood by one skilled in the art.

As further shown particularly in FIGS. 2A-2C, once the fulcrum bar 302, and thus the fulcrum assembly 300, is pivotally attached to the mounting assembly 200, the fulcrum bar 302, and thus the fulcrum assembly 300, may pivot freely with respect to at least the mounting assembly 200. Furthermore, at least part of the upper end portion 304 of the fulcrum bar 302 is capable of being disposed between the first and second mounting brackets 202, 212 of the mounting assembly 200 and may pivot so as to contact the stop 226 of the mounting assembly 200. When the fulcrum bar 302 contacts the stop 226 of the mounting assembly 200, the fulcrum bar 302, and thus the fulcrum assembly 300, is thereby prevented from further pivoting with respect to at least the mounting assembly 200, in the first rotational direction RD1, as will be further described herein.

Regarding overall construction of the fulcrum bar 302 of the fulcrum assembly 300, as a non-limiting example, the fulcrum bar 302 may be made from any suitable material, which is preferably strong, rigid and durable, such as steel, aluminum, alloys, some high-strength polymers, etc., and which may be formed by an extrusion manufacturing process or other manufacturing process, as may be understood by one skilled in the art.

As shown in at least FIGS. 1A, 1B, 3A-4B, 9, 10A and 10B, the fulcrum assembly 300 may further include at least one skid shield, such as an exemplary skid shield 316. In this example, as shown particularly in FIGS. 1A, 1B, 3A-3C, 4A, 4B, 9, 10A and 10B, the skid shield 316 of the fulcrum assembly 300 may include a generally cylindrical or ring-shaped main body 318, however, the overall shape of the main body 318 may be any suitable shape, as may be understood by one skilled in the art. The main body 318 of the skid shield 316 may have a cavity 320 defined therein and extending therethrough. The main body 318 of the skid shield 316 may further have an inner circumferential surface 322 disposed within the cavity 320 and an outer circumferential surface 324 disposed outside of the cavity 320. The main body 318 of the skid shield 316 may further have a top portion 326 and a bottom portion 328, which may each be advantageously curved or at least generally curved, as will be further described herein. The top portion 326 of the main body 318 of the skid shield 316 may have a top opening 330 formed therein which may extend completely through at least the top portion 326 of the main body 318. Furthermore, the bottom portion 328 of the main body 318 of the skid shield 316 may have a bottom opening 332 formed therein which may extend completely through at least the bottom portion 328 of the main body 318 and which is substantially aligned with the top opening 330 formed in the top portion 326 of the main body 318. The top and bottom openings 330, 332 formed in the respective top and bottom portions 326, 328 of the main body 318 of the skid shield 316 are each preferably shaped and sized so as to permit the fulcrum bar 302, and particularly at least the lower end portion 306 of the fulcrum bar 302, to be inserted into and extend through each of the top and bottom openings 330, 332 and be capable of moving freely through the top and bottom openings 330, 332. Furthermore, the top portion 326 of the main body 318 of the skid shield 316 may have an upper part 334, which, in this example, may be the uppermost surface area of the outer circumferential surface 324 of the main body 318 which immediately surrounds the top opening 330 formed in the top portion 326 of the main body 318. Similarly, the bottom portion 328 of the main body 318 of the skid shield 316 may have a lower part 336, which, in this example, may be the lowermost surface area of the outer circumferential surface 324 of the main body 318 which immediately surrounds the bottom opening 332 formed in the bottom portion 328 of the main body 318.

Furthermore, while not shown in the figures, the skid shield 316 of the fulcrum assembly 300 may further include at least one replaceable wear element (e.g., such as a film, a sheath, a strip, a layer, etc. made from a suitable wear-resistant material) which may be removably attached (e.g., by way of an adhesive or fasteners) to at least the bottom portion 328 of the main body 318 of the skid shield 316 so as to be capable of increasing the overall lifespan of the skid shield 316 by at least reducing wear directly on at least the bottom portion 328 of the main body 318 of the skid shield 316 (e.g., which may be caused by continual sliding or otherwise skidding over a surface, as will be further described herein).

Regarding overall construction of the skid shield 316 of the fulcrum assembly 300, as a non-limiting example, the skid shield 316, and particularly the main body 318 of the skid shield 316, may be made from any suitable material, including any suitable polymer which is preferably strong, rigid, durable and wear-resistant, such as a glass-filled nylon, high-density polyethylene (HDPE), acrylonitrile butadiene styrene (ABS), etc., and which may be injection molded or formed by other manufacturing processes, as may be understood by one skilled in the art. As another non-limiting example, the skid shield 316, and particularly the main body 318 of the skid shield 316, may be made from any suitable metal which is preferably strong, rigid, durable and wear-resistant, such as steel, aluminum, alloys, etc., and which may be formed by an extrusion manufacturing process, casting or other manufacturing process, as may be understood by one skilled in the art.

As further shown particularly in FIGS. 1A, 1B, 3A-3C, 4A, 4B, 9, 10A and 10B, the skid shield 316 of the fulcrum assembly 300 may be operably coupled to the fulcrum bar 302 of the fulcrum assembly 300, as will now be described in further detail. More specifically, the fulcrum assembly 300 may further include a biasing member 338, which, as a non-limiting example, may comprise a compression spring (e.g., made from any suitable material such as stainless steel, etc.) or other mass of compressible material (e.g., made from any suitable elastomer, etc.). Furthermore, as shown particularly in FIGS. 3A-3C, 4A and 4C, at least the lower end portion 306 of the fulcrum bar 302 may be inserted and extend into each of the top and bottom openings 330, 332 formed in the respective top and bottom portions 326, 328 of the main body 318 of the skid shield 316. Additionally, at the same time, the biasing member 338 may be disposed within the cavity 320 of the main body 318 of the skid shield 316 and may surround, or otherwise be disposed adjacent to, at least the lower end portion 306 of the fulcrum bar 302 (e.g., by way of at least the lower end portion 306 of the fulcrum bar 302 extending through an interior of the biasing member 338). Furthermore, the fulcrum assembly 300 may further include a generally elongated fastener 340 (e.g., such as a spring pin fastener), which may be inserted and secured into the at least one lower opening 314 formed in the fulcrum bar 302 proximate the lower end portion 306 of the fulcrum bar 302 (e.g., as shown particularly in at least FIGS. 4A and 4B). As such, the fastener 340 may extend completely through and beyond the at least one lower opening 314 formed in the fulcrum bar 302 proximate the lower end portion 306 of the fulcrum bar 302. Furthermore, the fastener 340 may extend at an orientation which is substantially perpendicular with respect to at least the lower end portion 306 of the fulcrum bar 302 such that the fastener 340 is disposed within the cavity 320 of the main body 318 of the skid shield 316, between at least the inner circumferential surface 322 of the main body 318 and the biasing member 338, so as to prevent the main body 318 from being removed from the fulcrum bar 302. As such, the biasing member 338 may be at least partially compressed (e.g., as shown in at least FIGS. 3A-3C) between the fastener 340 and the inner circumferential surface 322 of the main body 318 of the skid shield 316. In this manner, the biasing member 338 is therefore capable of biasing the skid shield 316, including at least the lower part 336 of the bottom portion 328 of the main body 318, downwardly with respect to at least the lowermost part 310 of the lower end portion 306 of the fulcrum bar 302 (e.g., as shown in at least FIGS. 3A-3C), as will be further described herein.

Figure 3A:
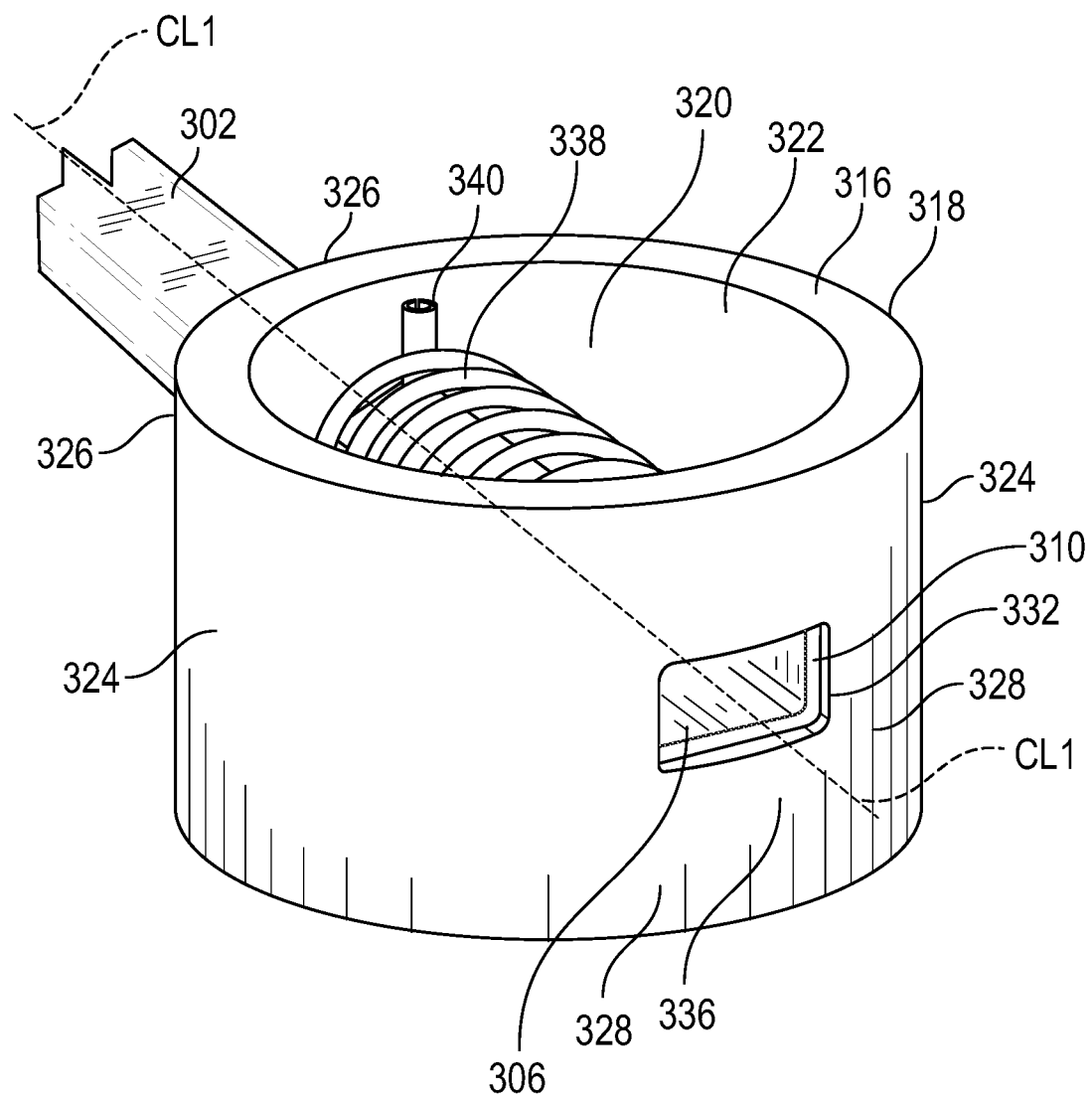
FIG. 3A is a bottom perspective view of an exemplary skid shield which may be implemented on an exemplary fulcrum assembly of the lifting aid shown in at least FIGS. 1A and 1B, illustrating the skid shield in a fully downward position with respect to at least an exemplary fulcrum bar of the fulcrum assembly.
Figure 3B:
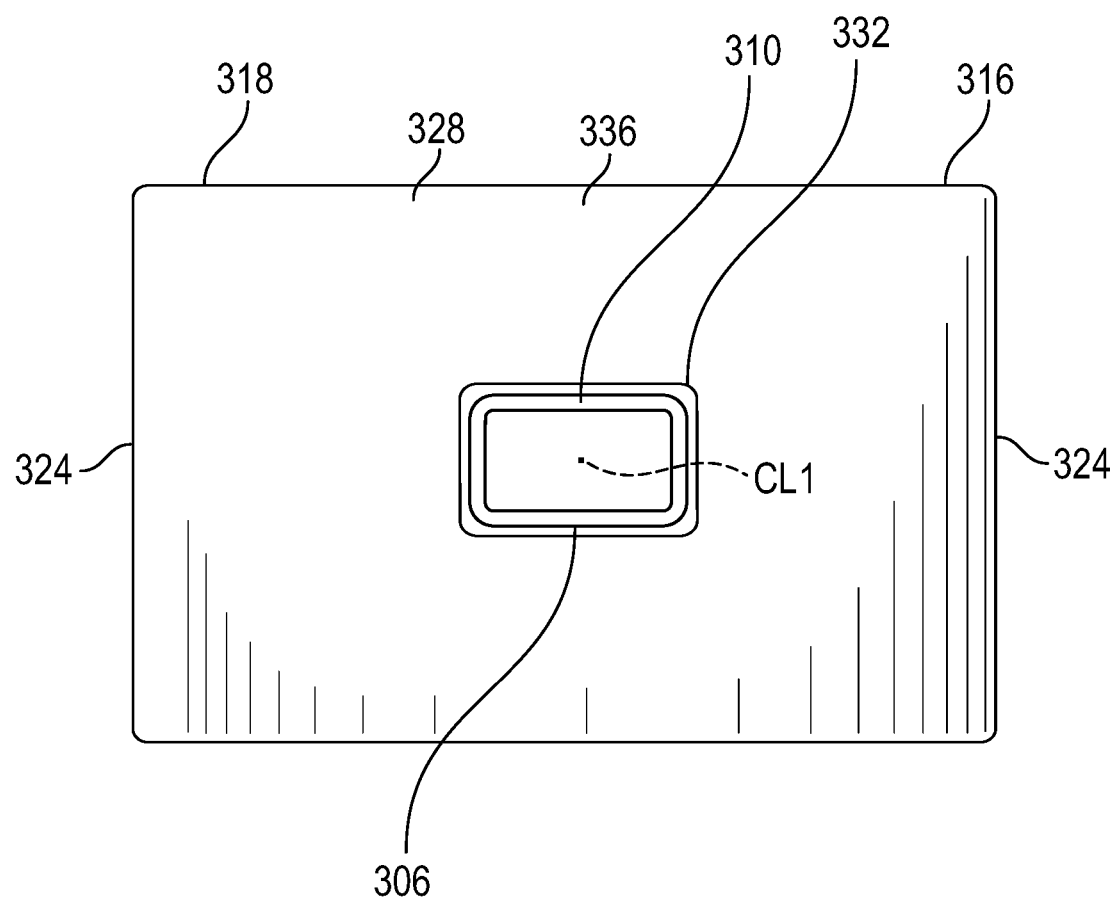
FIG. 3B is a bottom view of the skid shield shown in FIG. 3A, further illustrating the skid shield in the fully downward position with respect to at least the fulcrum bar.
Figure 3C:
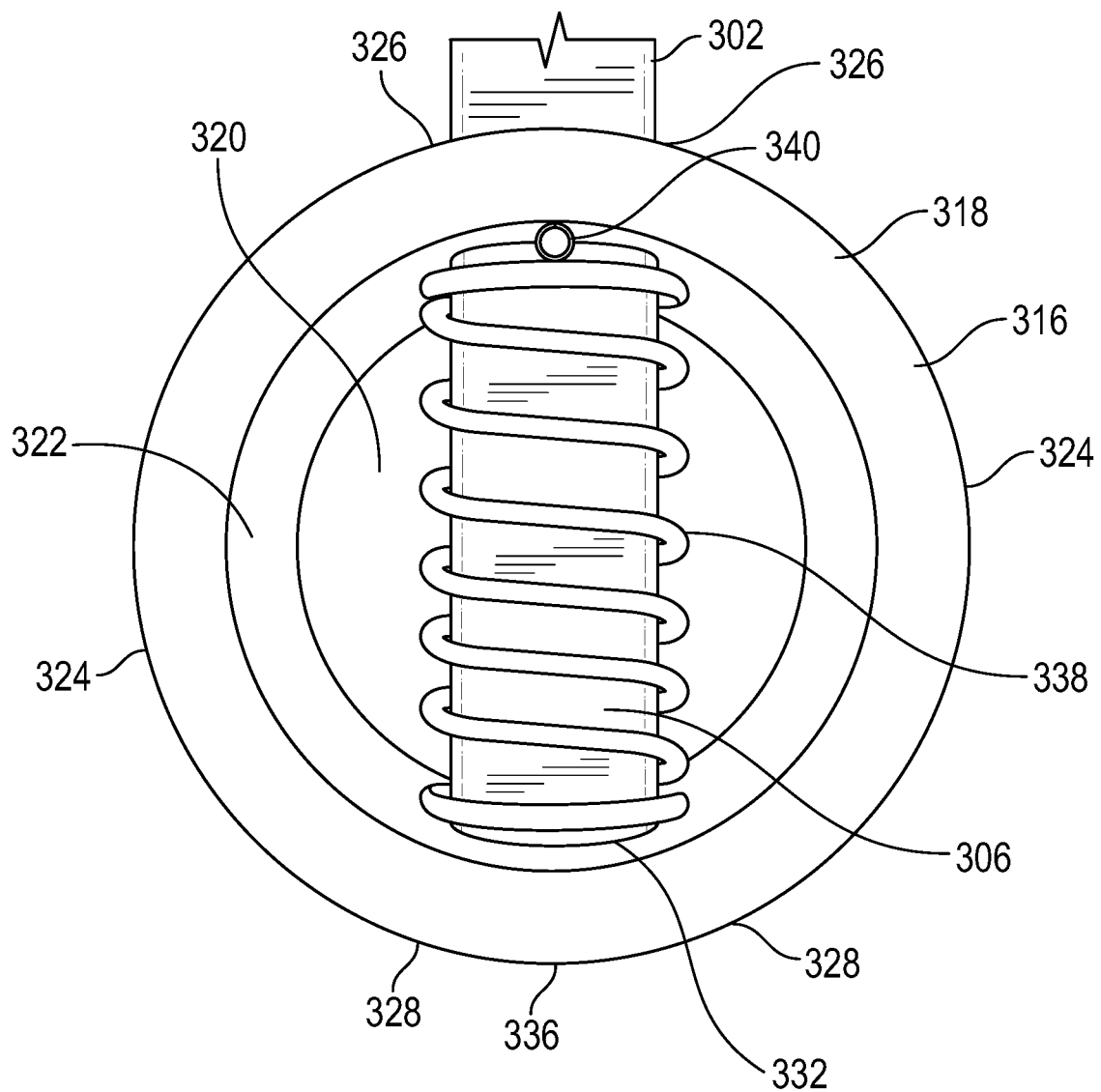
FIG. 3C is a right-side view of the skid shield shown in at least FIGS. 3A and 3B, further illustrating the skid shield in the fully downward position with respect to at least the fulcrum bar.
Figure 4A:
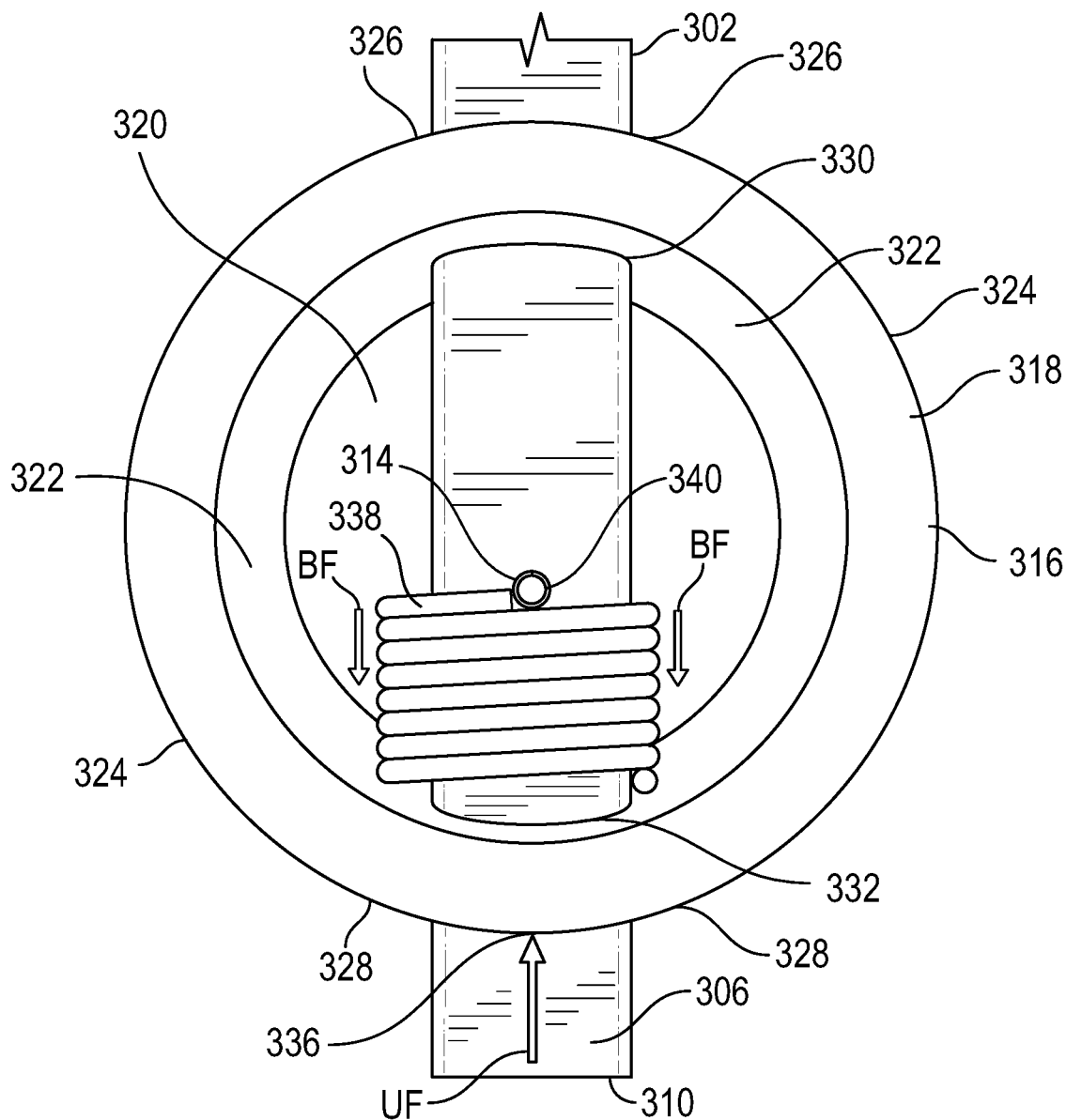
FIG. 4A is a left-side view of the skid shield shown in at least FIGS. 3A-3C, illustrating the skid shield in a fully upward position with respect to at least the fulcrum bar.

Therefore, given the overall relationship between the fulcrum bar 302 of the fulcrum assembly 300, the top and bottom openings 330, 332 formed in the respective top and bottom portions 326, 328 of the main body 318 of the skid shield 316 of the fulcrum assembly 300, the at least one lower opening 314 formed in the fulcrum bar 302 proximate the lower end portion 306 of the fulcrum bar 302, the fastener 340 of the fulcrum assembly 300 and the biasing member 338 of the fulcrum assembly 300, the skid shield 316 may therefore be operably coupled to the fulcrum bar 302, proximate the lower end portion 306 of the fulcrum bar 302, such that (i) the longitudinal centerline CL1 of the fulcrum bar 302 extends through at least the top and bottom openings 330, 332 formed in the respective top and bottom portions 326, 328 of the main body 318 of the skid shield 316, (ii) at least the lowermost part 310 of the lower end portion 306 of the fulcrum bar 302 is capable of being disposed within the bottom opening 332 formed in the bottom portion 328 of the main body 318 of the skid shield 316 (i.e., the bottom portion 328 of the main body 318 of the skid shield 316 therefore being disposed adjacent to at least the lowermost part 310 of the lower end portion 306 of the fulcrum bar 302) and (iii) at least the lower part 336 of the bottom portion 328 of the main body 318 of the skid shield 316 is capable of moving, at least in a substantially linear manner at least along the longitudinal centerline CL1 of the fulcrum bar 302, upwardly above the lowermost part 310 of the lower end portion 306 of the fulcrum bar 302 (e.g., when the fulcrum bar 302 is held stationary and an upward force UF applied to at least the bottom portion 328 of the main body 318 of the skid shield 316 exceeds a biasing force BF of the biasing member 338—as shown in FIG. 4A) and downwardly below the lowermost part 310 of the lower end portion 306 of the fulcrum bar 302 (e.g., when the fulcrum bar 302 is held stationary and the upward force UF applied to at least the bottom portion 328 of the main body 318 of the skid shield 316 does not exceed the biasing force BF of the biasing member 338 or when the upward force UF is no longer applied to at least the bottom portion 328 of the main body 318 of the skid shield 316—as shown in FIGS. 3A-3C).

As shown in at least FIGS. 5A, 5B, 6A and 6B, the at least one skid shield of the fulcrum assembly 300 may be an alternative exemplary skid shield 316'. In this example, the skid shield 316' of the fulcrum assembly 300 may include a generally cylindrical, compressible main body 318', however, the overall shape of the main body 318' may be any suitable shape, as may be understood by one skilled in the art. The main body 318' of the skid shield 316' may have a generally elongated, compressible center section 319'. The main body 318' of the skid shield 316' may further have a plurality of cavities 320' defined therein and extending therethrough, which may each be disposed adjacent to at least the center section 319' of the main body 318'. The main body 318' of the skid shield 316' may further have a plurality of generally curved inner surfaces 322' each disposed within the respective plurality of cavities 320'. The main body 318' of the skid shield 316' may further have an outer circumferential surface 324' disposed outside of the plurality of cavities 320'. The main body 318' of the skid shield 316' may further have a top portion 326' and a bottom portion 328', which may each be advantageously curved or at least generally curved, as will be further described herein. The main body 318' of the skid shield 316' may further have a generally elongated central opening 330' formed therein and extending completely through at least the top portion 326', the center section 319' and the bottom portion 328' of the main body 318'. The central opening 330' is preferably shaped and sized so as to permit the fulcrum bar 302, and particularly at least the lower end portion 306 of the fulcrum bar 302, to be inserted into and extend through the central opening 330' and be capable of moving freely through the central opening 330'. The main body 318' of the skid shield 316' may further have at least one opening 331' formed therein, and extending therethrough (e.g., through the center section 319' of the main body 318'), proximate the top portion 326' of the main body 318', as will be further described herein. Furthermore, the top portion 326' of the main body 318' of the skid shield 316' may have an upper part 334', which, in this example, may be the uppermost surface area of the outer circumferential surface 324' of the main body 318' which immediately surrounds the central opening 330' formed in and extending through the main body 318'. Similarly, the bottom portion 328' of the main body 318' of the skid shield 316' may have a lower part 336', which, in this example, may be the lowermost surface area of the outer circumferential surface 324' of the main body 318' which immediately surrounds the central opening 330' formed in and extending through the main body 318'.

Furthermore, while not shown in the figures, the skid shield 316' of the fulcrum assembly 300 may further include at least one replaceable wear element (e.g., such as a film, a sheath, a strip, a layer, etc. made from a suitable wear-resistant material) which may be removably attached (e.g., by way of an adhesive or fasteners) to at least the bottom portion 328' of the main body 318' of the skid shield 316' so as to be capable of increasing the overall lifespan of the skid shield 316' by at least reducing wear directly on at least the bottom portion 328' of the main body 318' of the skid shield 316' (e.g., which may be caused by continual sliding or otherwise skidding over a surface, as will be further described herein).

Regarding overall construction of the skid shield 316' of the fulcrum assembly 300, as a non-limiting example, the skid shield 316', and particularly the main body 318' of the skid shield 316', may be made from any suitable compressible material, including any suitable elastomer which is preferably compressible and resilient, such as urethanes, natural rubbers, synthetic rubbers, etc., and which may be injection molded or formed by other manufacturing processes, as may be understood by one skilled in the art.

As further shown in FIGS. 5A, 5B, 6A and 6B, the skid shield 316' of the fulcrum assembly 300 may be operably coupled to the fulcrum bar 302 of the fulcrum assembly 300, as will now be described in further detail. As shown particularly in at least FIGS. 5A and 5B, at least the lower end portion 306 of the fulcrum bar 302 may be inserted and extend into the central opening 330' formed in the main body 318' of the skid shield 316'. Furthermore, the generally elongated fastener 340 (e.g., such as a spring pin fastener) of the fulcrum assembly 300, as previously described herein, may be inserted into the at least one opening 331' formed in the main body 318' of the skid shield 316' and further secured into the at least one lower opening 314 formed in the fulcrum bar 302 proximate the lower end portion 306 of the fulcrum bar 302 (e.g., as shown particularly in at least FIGS. 5A, 6A and 6B). As such, the fastener 340 may extend at an orientation which is substantially perpendicular with respect to at least the lower end portion 306 of the fulcrum bar 302, while extending through the at least one opening 331' formed in the main body 318' of the skid shield 316' and completely through the at least one lower opening 314 formed in the fulcrum bar 302 proximate the lower end portion 306 of the fulcrum bar 302. In this manner, the fastener 340 prevents the main body 318' of the skid shield 316' from being removed from the fulcrum bar 302. Furthermore, as shown particularly in FIGS. 5A and 5B, at least the center section 319' of the main body 318' of the skid shield 316' is capable of acting as a biasing member 338', and is therefore capable of biasing the skid shield 316', including at least the bottom portion 328' of the main body 318' of the skid shield 316' and the lower part 336' of the bottom portion 328' of the main body 318', downwardly with respect to at least the lowermost part 310 of the lower end portion 306 of the fulcrum bar 302 (e.g., when the compressible material of the skid shield 316', including at least the compressible material of the center section 319' and the bottom portion 328' of the main body 318' of the skid shield 316', is decompressed), as will be further described herein.

Figure 5A:
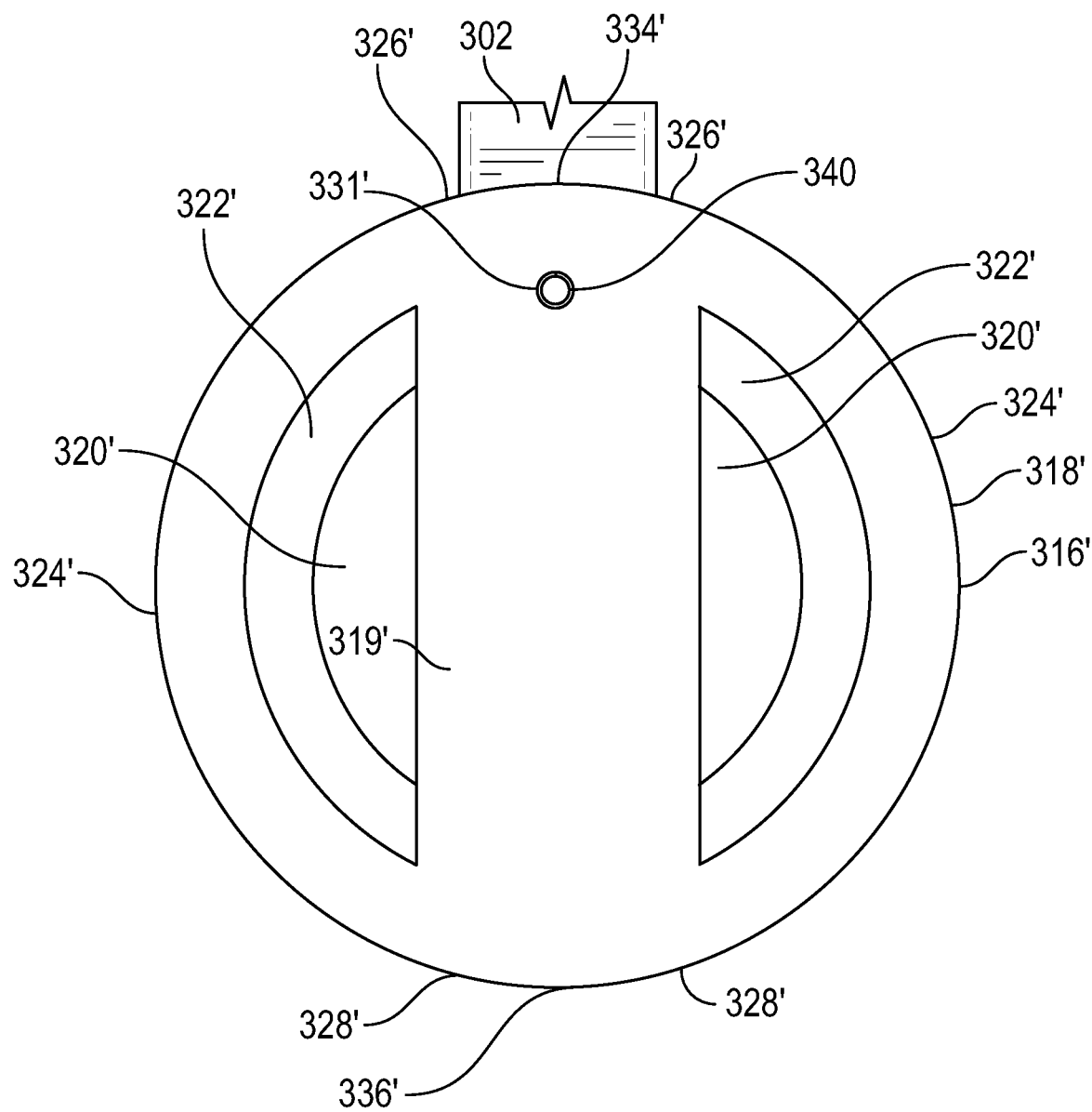
FIG. 5A is a left-side view of an alternative exemplary skid shield which may be implemented on the fulcrum assembly of the lifting aid shown in at least FIGS. 1A and 1B, illustrating the skid shield in a downward position with respect to at least the fulcrum bar.
Figure 5B:
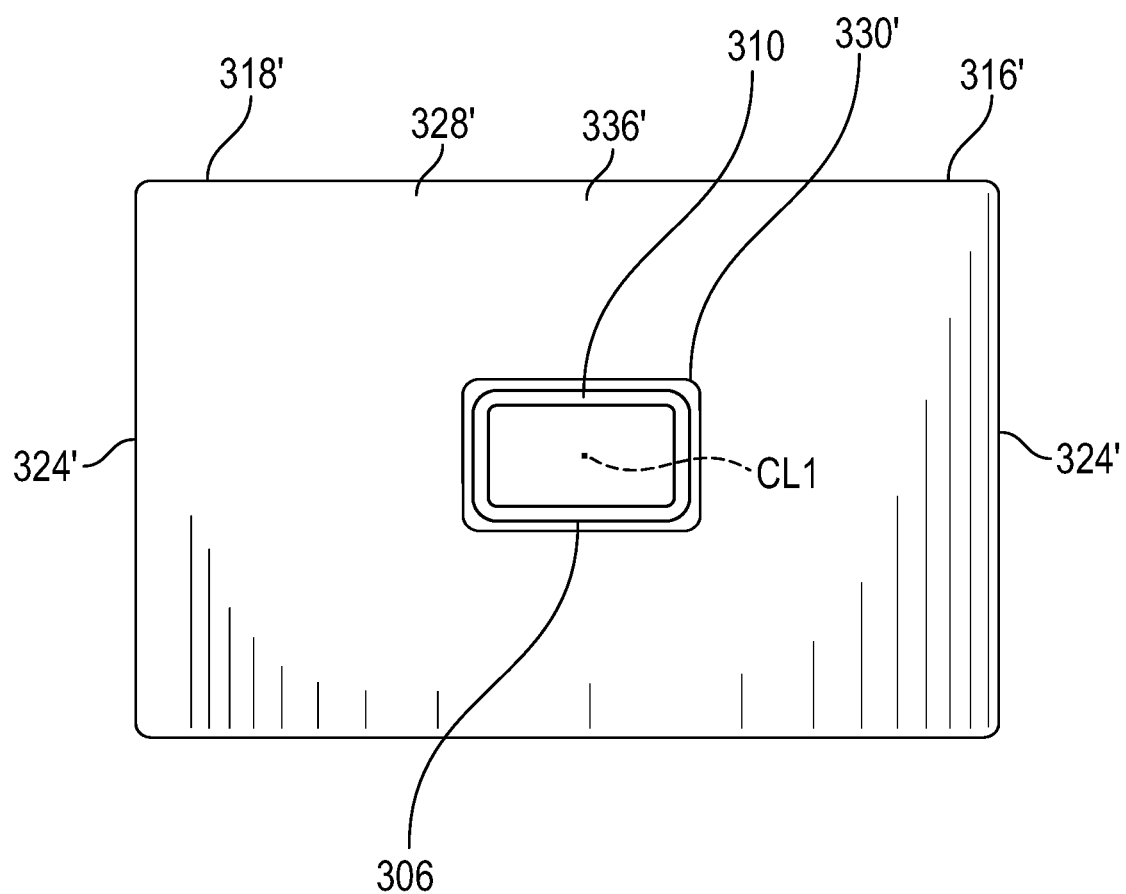
FIG. 5B is a bottom view of the skid shield shown in FIG. 5A, further illustrating the skid shield in the downward position with respect to at least the fulcrum bar.
Figure 6A:
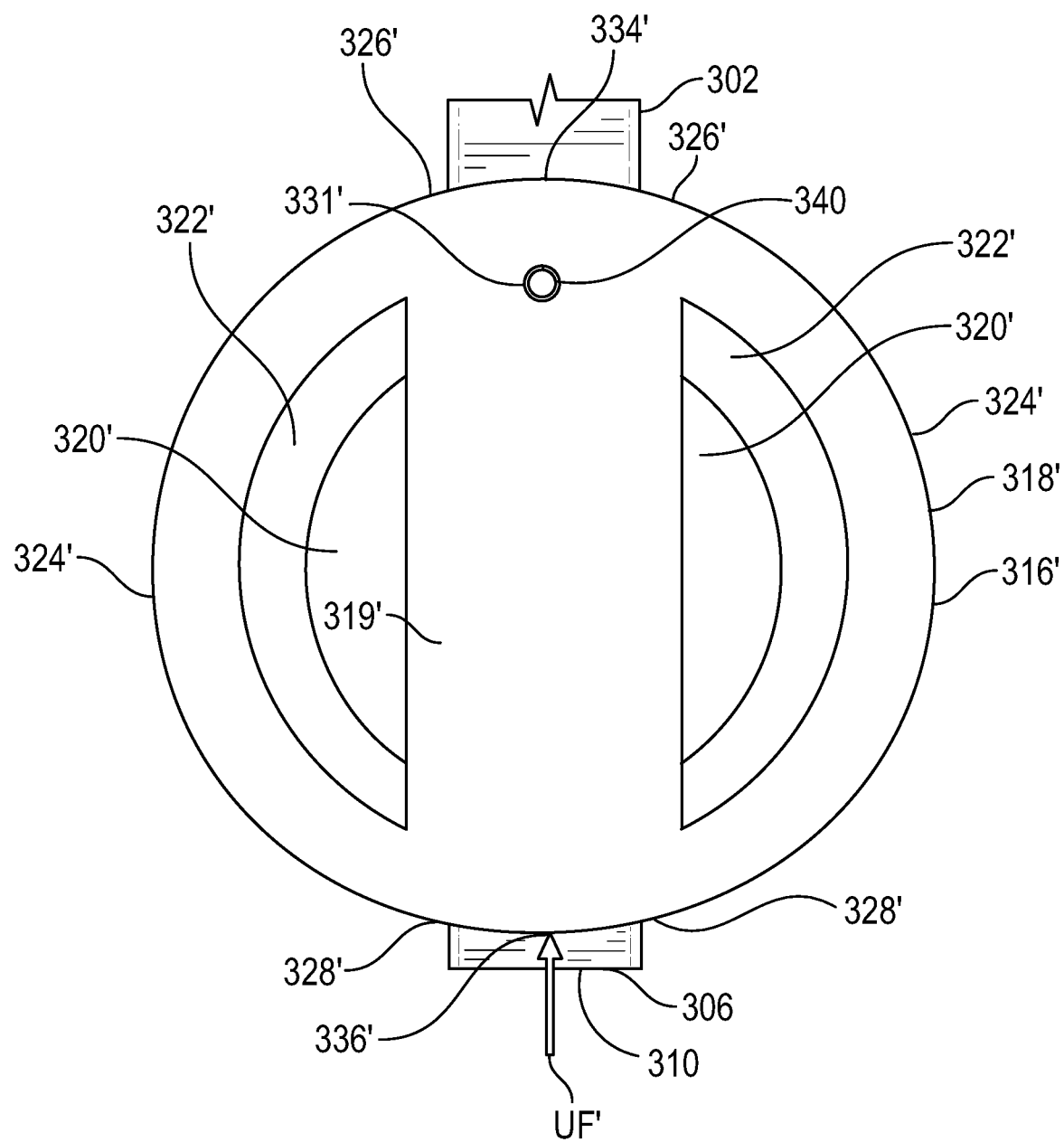
FIG. 6A is a left-side view of the skid shield shown in at least FIGS. 5A and 5B, illustrating the skid shield in an upward position with respect to at least the fulcrum bar.

Therefore, given the overall relationship between the fulcrum bar 302 of the fulcrum assembly 300, the central opening 330' formed in the main body 318' of the skid shield 316' of the fulcrum assembly 300, the at least one opening 331' formed in the main body 318' of the skid shield 316', the at least one lower opening 314 formed in the fulcrum bar 302 proximate the lower end portion 306 of the fulcrum bar 302 and the fastener 340 of the fulcrum assembly 300 (e.g., as previously described herein), the skid shield 316' may therefore be operably coupled to the fulcrum bar 302, proximate the lower end portion 306 of the fulcrum bar 302, such that (i) the longitudinal centerline CL1 of the fulcrum bar 302 extends through at least the central opening 330' formed in the main body 318' of the skid shield 316', (ii) at least the lowermost part 310 of the lower end portion 306 of the fulcrum bar 302 is capable of being disposed within the central opening 330' formed in the main body 318' of the skid shield 316' (i.e., the bottom portion 328' of the main body 318' of the skid shield 316' therefore being disposed adjacent to at least the lowermost part 310 of the lower end portion 306 of the fulcrum bar 302), (iii) at least the bottom portion 328' (e.g., the compressible material thereof) of the main body 318' of the skid shield 316' is capable of being compressed, at least in a substantially linear manner at least along the longitudinal centerline CL1 of the fulcrum bar 302, upwardly above the lowermost part 310 of the lower end portion 306 of the fulcrum bar 302 (e.g., when the fulcrum bar 302 is held stationary and an upward force UF' applied to at least the bottom portion 328' of the main body 318' of the skid shield 316' is sufficient to compress at least the compressible material of the bottom portion 328' and center section 319' of the main body 318' of the skid shield 316'—as shown in FIG. 6A) such that at least the lowermost part 310 of the lower end portion 306 of the fulcrum bar 302 is disposed outside of (i.e., below) the central opening 330' formed in the main body 318' of the skid shield 316' (e.g., as shown in FIG. 6A) and (iv) at least the bottom portion 328' (e.g., the compressible material thereof) of the main body 318' of the skid shield 316' is further capable of being decompressed, at least in a substantially linear manner at least along the longitudinal centerline CL1 of the fulcrum bar 302, downwardly below the lowermost part 310 of the lower end portion 306 of the fulcrum bar 302 (e.g., when the fulcrum bar 302 is held stationary and the upward force UF' applied to at least the bottom portion 328' of the main body 318' of the skid shield 316' is not sufficient to compress at least the compressible material of the bottom portion 328' and center section 319' of the main body 318' of the skid shield 316', or when the upward force UF' is not applied to at least the bottom portion 328' of the main body 318' of the skid shield 316'—as shown in FIGS. 5A and 5B) such that at least the lowermost part 310 of the lower end portion 306 of the fulcrum bar 302 is disposed within the central opening 330' formed in the main body 318' of the skid shield 316' (e.g., as shown in FIGS. 5A and 5B).

As shown in at least FIGS. 7A-7C, 8A and 8B, the at least one skid shield of the fulcrum assembly 300 may be yet another alternative exemplary skid shield in the form of first and second skid shields 316A", 316B". In this example, each of the respective first and second skid shields 316A", 316B" of the fulcrum assembly 300 may include a generally cylindrical, generally circular or otherwise wheel-like compressible main body 318A", 318B", however, the overall shape of each of the respective main bodies 318A", 318B" may be any suitable shape, as may be understood by one skilled in the art. The main body 318A", 318B" of each of the respective first and second skid shields 316A", 316B" may have a generally circular center section 319A", 319B". The main body 318A", 318B" of each of the respective first and second skid shields 316A", 316B" may further have a plurality of cavities 320A", 320B" defined therein and extending therethrough, which may each be disposed adjacent to at least the center section 319A", 319B" of the main body 318A", 318B". The main body 318A", 318B" of each of the respective first and second skid shields 316A", 316B" may further have a plurality of generally curved inner surfaces 322A", 322B" each disposed within the respective plurality of cavities 320A", 320B". The main body 318A", 318B" of each of the respective first and second skid shields 316A", 316B" may further have an outer circumferential surface 324A", 324B" disposed outside of the plurality of cavities 320A", 320B". The main body 318A", 318B" of each of the respective first and second skid shields 316A", 316B" may further have a top portion 326A", 326B" and a bottom portion 328A", 328B", which may each be advantageously curved or at least generally curved, as will be further described herein. The main body 318A", 318B" of each of the respective first and second skid shields 316A", 316B" may further have at least one opening 331A", 331B" formed therein, and extending therethrough, at or proximate a center of the center section 319A", 319B" of the main body 318A", 318B", as will be further described herein. Furthermore, the top portion 326A", 326B" of each of the respective main bodies 318A", 318B" of each of the respective first and second skid shields 316A", 316B" may have an upper part 334A", 334B", which, in this example, may be the uppermost surface area of the outer circumferential surface 324A", 324B" of the main body 318A", 318B". Similarly, the bottom portion 328A", 328B" of each of the respective main bodies 318A", 318B" of each of the respective first and second skid shields 316A", 316B" may have a lower part 336A", 336B", which, in this example, may be the lowermost surface area of the outer circumferential surface 324A", 324B" of the main body 318A", 318B".

Furthermore, while not shown in the figures, each of the respective first and second skid shields 316A", 316B" of the fulcrum assembly 300 may further include at least one replaceable wear element (e.g., such as a film, a sheath, a strip, a layer, etc. made from a suitable wear-resistant material) which may be removably attached (e.g., by way of an adhesive or fasteners) to at least the bottom portion 328A", 328B" of the main body 318A", 318B" of each of the respective first and second skid shields 316A", 316B" so as to be capable of increasing the overall lifespan of each of the respective first and second skid shields 316A", 316B" by at least reducing wear directly on at least the bottom portion 328A", 328B" of the main body 318A", 318B" of each of the respective first and second skid shields 316A", 316B" (e.g., which may be caused by continual sliding or otherwise skidding over a surface, as will be further described herein).

Regarding overall construction of each of the respective first and second skid shields 316A", 316B" of the fulcrum assembly 300, as a non-limiting example, each of the respective first and second skid shields 316A", 316B", and particularly the main body 318A", 318B" of each of the respective first and second skid shields 316A", 316B", may be made from any suitable material, including any suitable elastomer which is preferably compressible and resilient, such as urethanes, natural rubbers, synthetic rubbers, etc., and which may be injection molded or formed by other manufacturing processes, as may be understood by one skilled in the art.

As further shown in FIGS. 7A-7C, 8A and 8B, each of the respective first and second skid shields 316A", 316B" of the fulcrum assembly 300 may be operably coupled to the fulcrum bar 302 of the fulcrum assembly 300, as will now be described in further detail. More specifically, at least the lower end portion 306 of the fulcrum bar 302 may be disposed between, or otherwise adjacent to, each of the respective main bodies 318A", 318B" of each of the respective first and second skid shields 316A", 316B". Furthermore, the generally elongated fastener 340 (e.g., in this case, an axle, bolt or other suitable fastener) of the fulcrum assembly 300 may be inserted into, and extend through, the at least one opening 331A", 331B" formed in each of the respective main bodies 318A", 318B" of each of the respective first and second skid shields 316A", 316B" and through the at least one lower opening 314 formed in the fulcrum bar 302 proximate the lower end portion 306 of the fulcrum bar 302 (e.g., as shown particularly in at least FIGS. 7A and 7B). As such, the fastener 340 may extend at an orientation which is substantially perpendicular with respect to at least the lower end portion 306 of the fulcrum bar 302, while extending through the at least one opening 331A", 331B" formed in each of the respective main bodies 318A", 318B" of each of the respective first and second skid shields 316A", 316B"

and through the at least one lower opening 314 formed in the fulcrum bar 302 proximate the lower end portion 306 of the fulcrum bar 302. In this manner, when securely fastened (e.g., by way of a nut or cotter pin (not shown) being securely fastened on the fastener 340), the fastener 340 prevents each of the respective main bodies 318A", 318B" of each of the respective first and second skid shields 316A", 316B" from being removed from the fulcrum bar 302. Furthermore, based on at least the type of fastener 340 employed, each of the respective main bodies 318A", 318B" of each of the respective first and second skid shields 316A", 316B" may be rotatably operably coupled to the fulcrum bar 302 or non-rotatably operably coupled to the fulcrum bar 302, as may be understood by one skilled in the art.

Figure 7A:
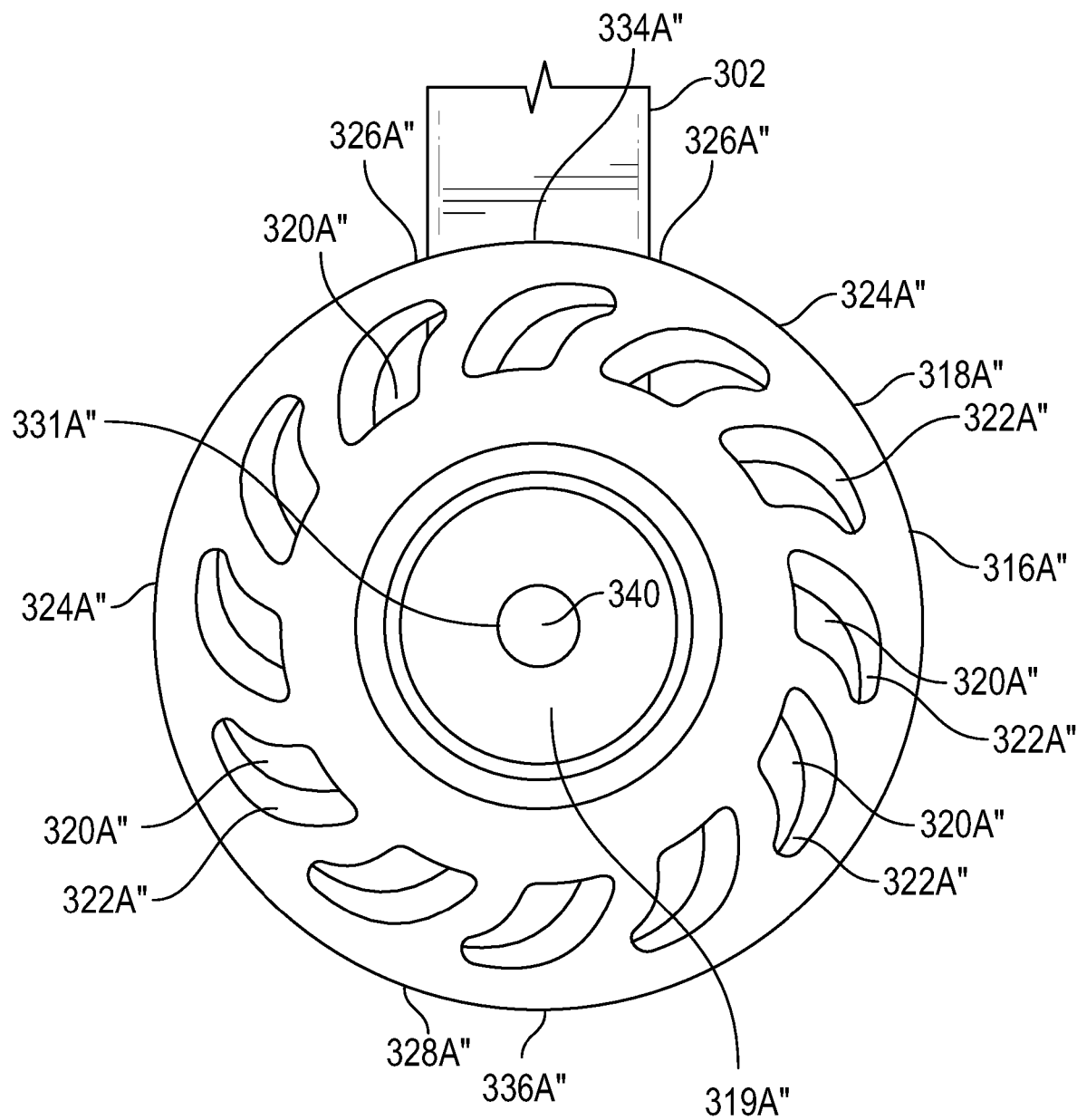
FIG. 7A is a left-side view of another alternative exemplary skid shield, in the form of first and second exemplary skid shields, which may be implemented on the fulcrum assembly of the lifting aid shown in at least FIGS. 1A and 1B, illustrating a left-side view of the first skid shield in a downward position with respect to at least the fulcrum bar.
Figure 7B:
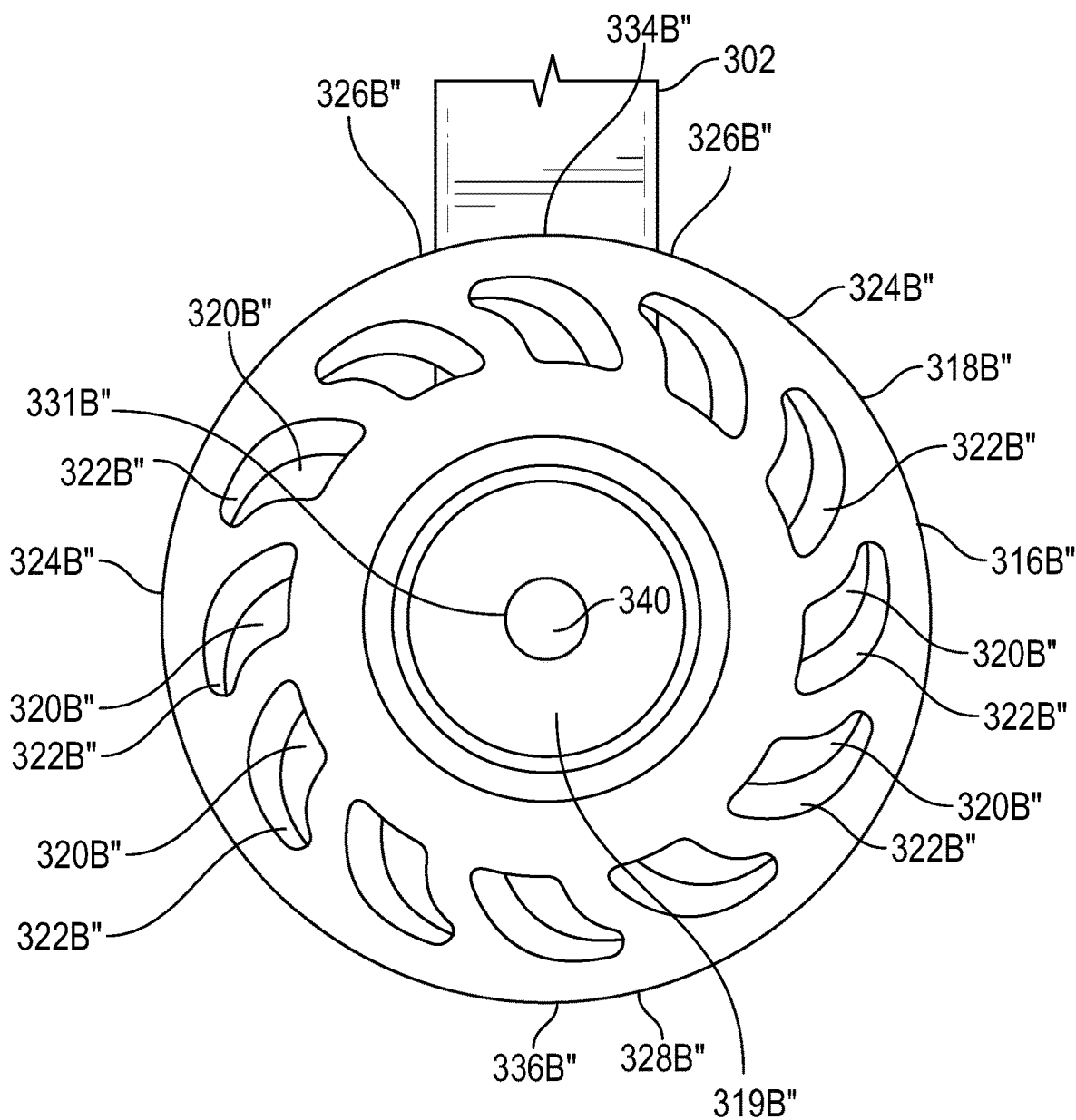
FIG. 7B is a right-side view of the second skid shield in a downward position with respect to at least the fulcrum bar.
Figure 7C:
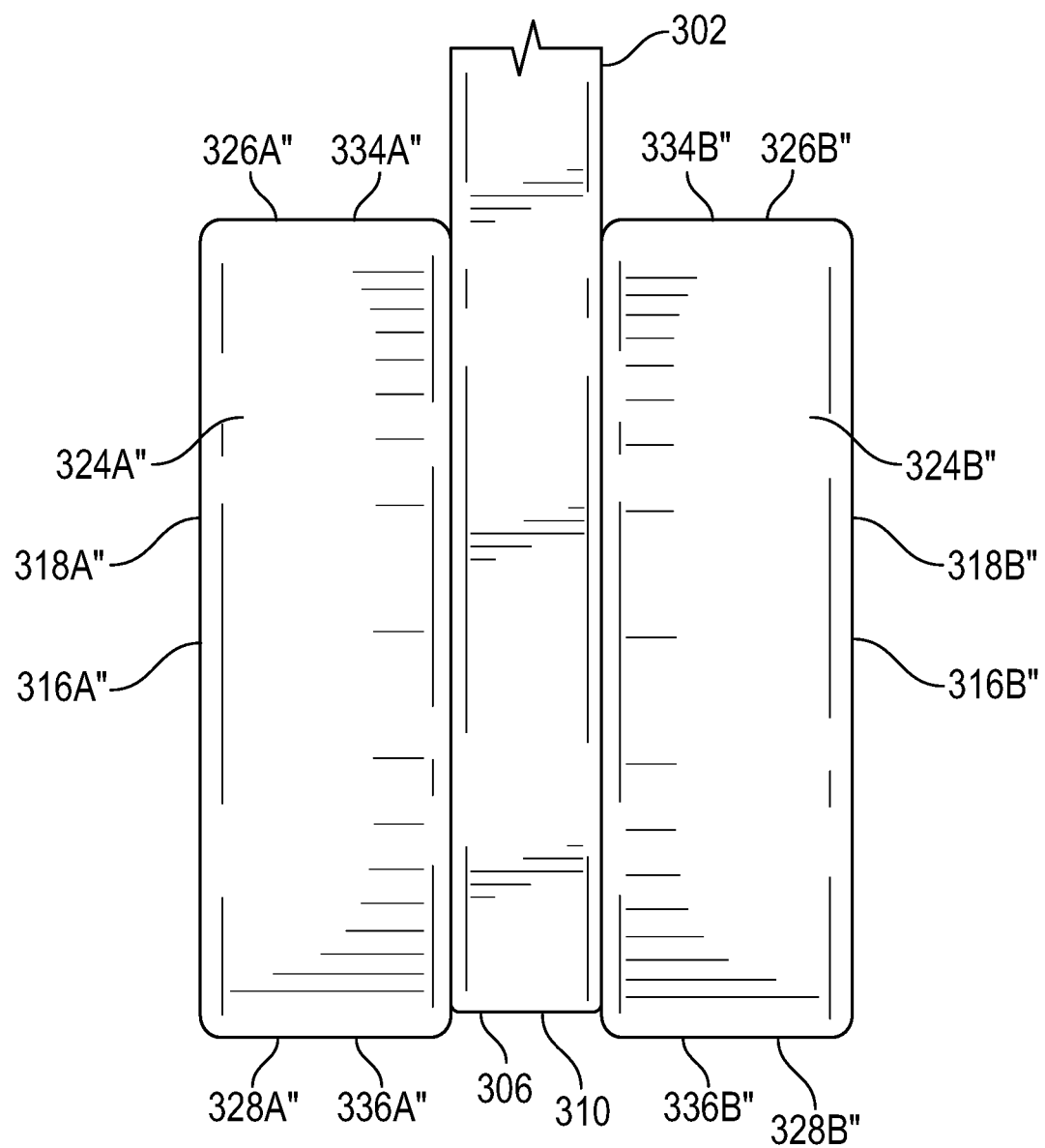
FIG. 7C is a rear view of the first and second skid shields shown in at least FIGS. 7A and 7B, further illustrating the first and second skid shields each in the downward position with respect to at least the fulcrum bar.
Figure 8A:
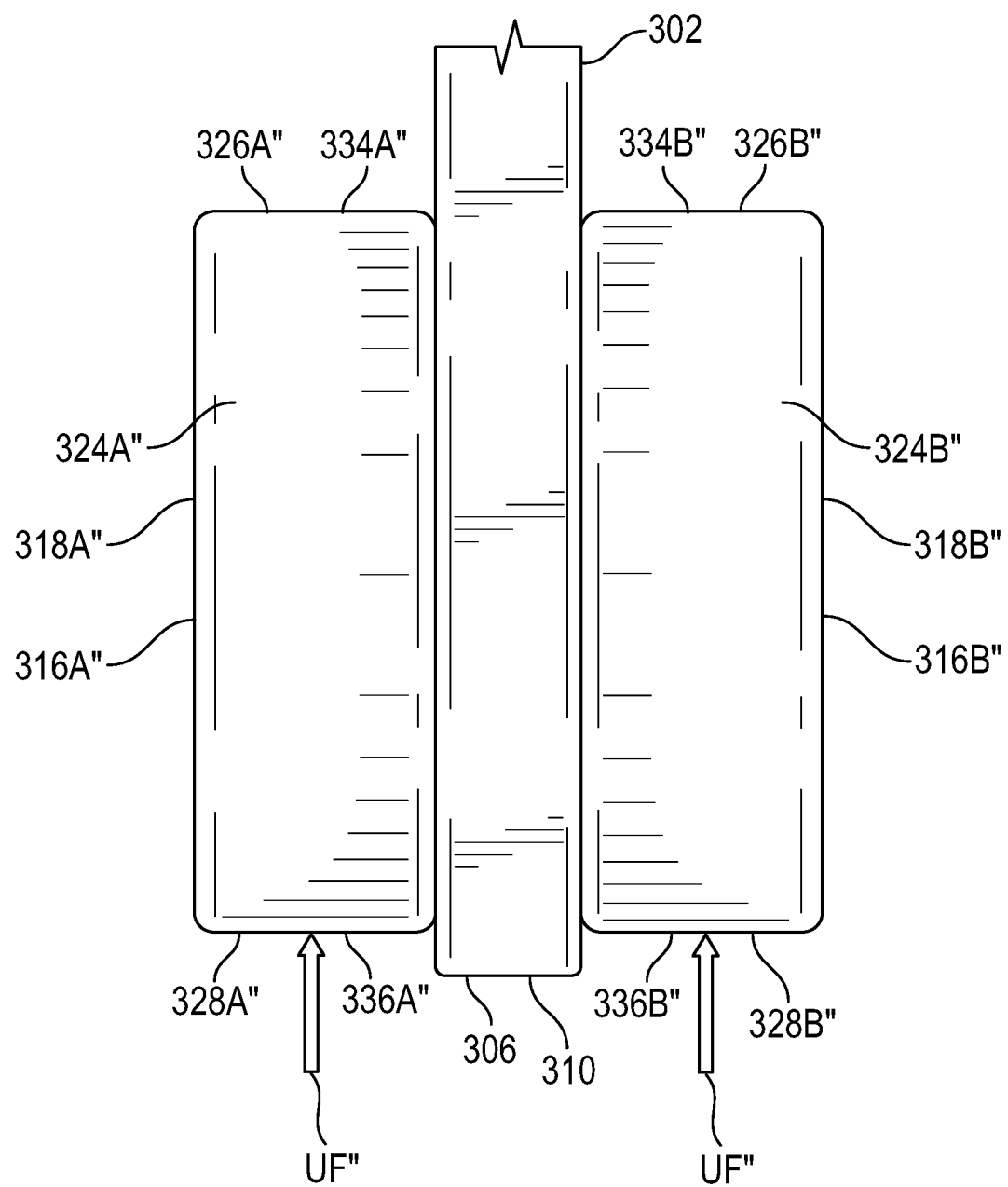
FIG. 8A is a rear view of the first and second skid shields shown in at least FIGS. 7A-7C, illustrating the first and second skid shields each in an upward position with respect to at least the fulcrum bar.

Therefore, given the overall relationship between the fulcrum bar 302 of the fulcrum assembly 300, the at least one opening 331A", 331B" formed in each of the respective main bodies 318A", 318B" of each of the respective first and second skid shields 316A", 316B", the at least one lower opening 314 formed in the fulcrum bar 302 proximate the lower end portion 306 of the fulcrum bar 302 and the fastener 340 of the fulcrum assembly 300, each of the respective first and second skid shields 316A", 316B" may therefore be operably coupled to the fulcrum bar 302, proximate the lower end portion 306 of the fulcrum bar 302, such that (i) at least the bottom portion 328A", 328B" of each of the respective main bodies 318A", 318B" of each of the respective first and second skid shields 316A", 316B" is disposed adjacent to the lowermost part 310 of the lower end portion 306 of the fulcrum bar 302, (ii) at least the bottom portion 328A", 328B"(e.g., the compressible material thereof, including at least the compressible material of the lower part 336A", 336B" of the bottom portion 328A", 328B") of each of the respective main bodies 318A", 318B" of each of the respective first and second skid shields 316A", 316B" is capable of being compressed, at least in a substantially linear manner, upwardly above the lowermost part 310 of the lower end portion 306 of the fulcrum bar 302 (e.g., when the fulcrum bar 302 is held stationary and an upward force UF" applied to at least the bottom portion 328A", 328B" of each of the respective main bodies 318A", 318B" of each of the respective first and second skid shields 316A", 316B" is sufficient to compress at least the compressible material of the bottom portion 328A", 328B" of each of the respective main bodies 318A", 318B" of each of the respective first and second skid shields 316A", 316B"—as shown in FIG. 8A) and (iii) at least the bottom portion 328A", 328B" (e.g., the compressible material thereof, including at least the compressible material of the lower part 336A", 336B" of the bottom portion 328A", 328B") of each of the respective main bodies 318A", 318B" of each of the respective first and second skid shields 316A", 316B" is further capable of being decompressed, at least in a substantially linear manner, downwardly below the lowermost part 310 of the lower end portion 306 of the fulcrum bar 302 (e.g., when the fulcrum bar 302 is held stationary and the upward force UF" applied to at least the bottom portion 328A", 328B" of each of the respective main bodies 318A", 318B" of each of the respective first and second skid shields 316A", 316B" is not sufficient to compress at least the compressible material of the bottom portion 328A", 328B" of each of the respective main bodies 318A", 318B" of each of the respective first and second skid shields 316A", 316B", or when the upward force UF" is not applied to at least the bottom portion 328A", 328B" of each of the respective main bodies 318A", 318B" of each of the respective first and second skid shields 316A", 316B"—as shown in FIGS. 7A-7C).

Figure 9:
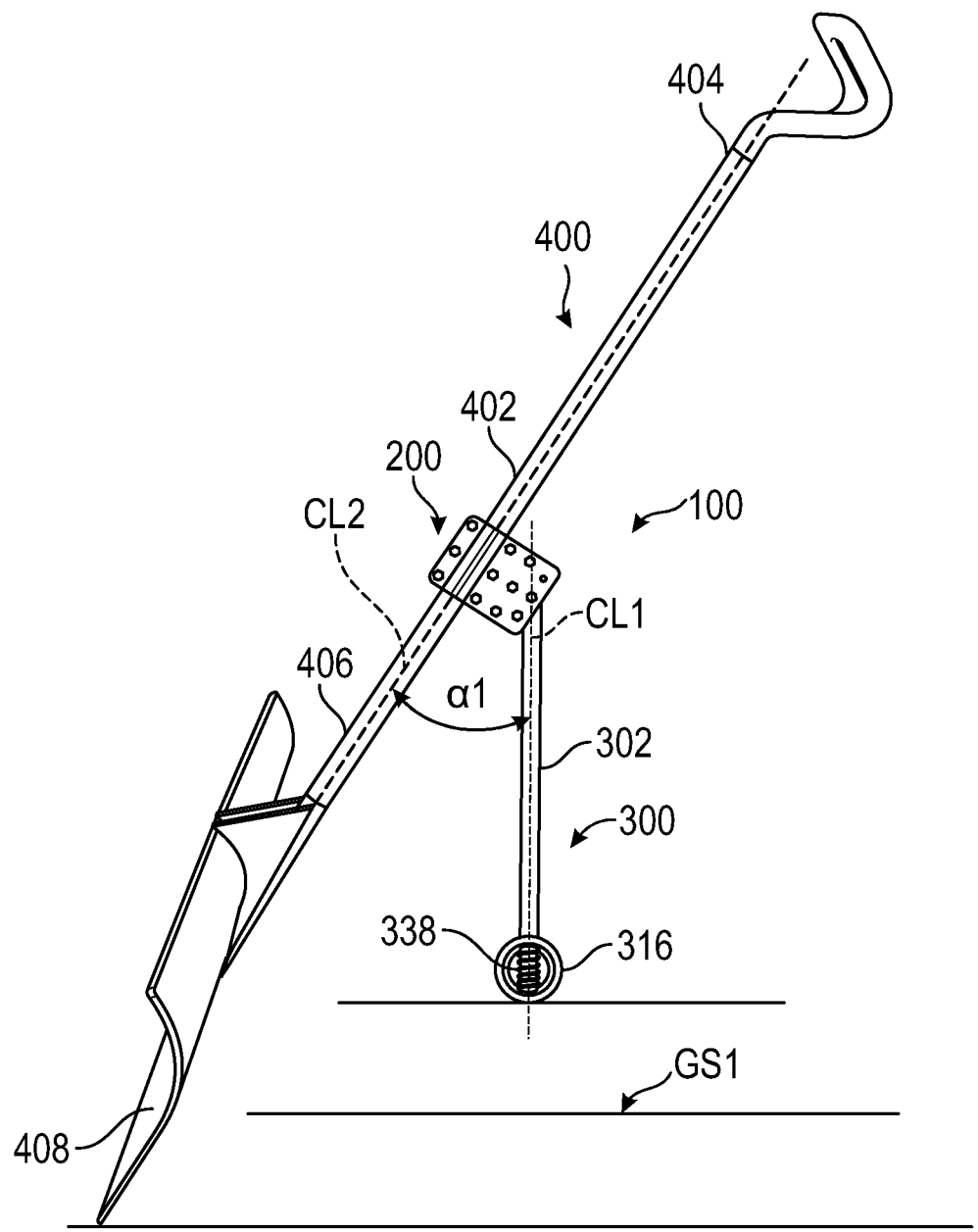
FIG. 9 is a left-side view of an exemplary long-handled implement, illustrating the lifting aid shown in at least FIGS. 1A and 1B attached to an elongated portion of the long-handled implement, and further illustrating the fulcrum assembly of the lifting aid contacting a ground surface in a stopped, substantially upright supporting position.
Figure 10A:
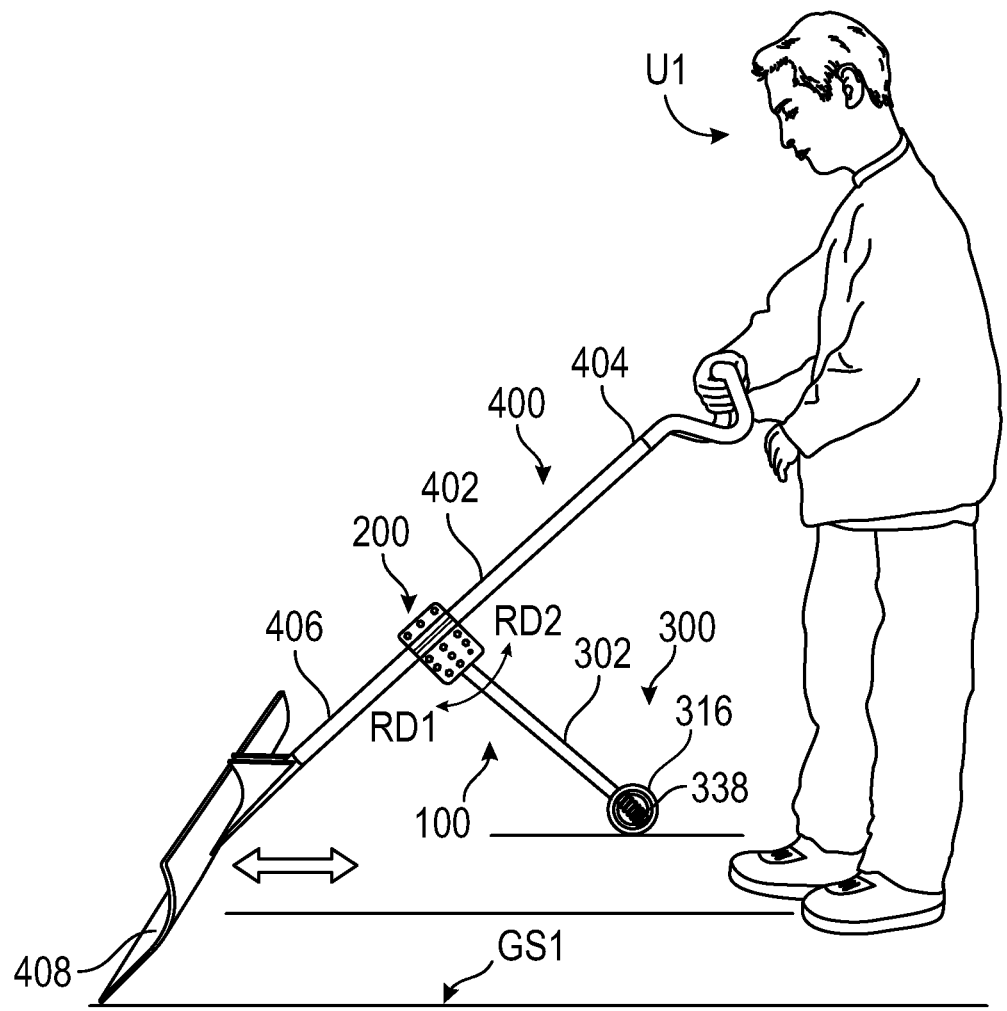
FIG. 10A is a left-side view of the long-handled implement and lifting aid shown in FIG. 9, illustrating a user moving the long-handled implement across the ground surface, and further illustrating the fulcrum assembly of the lifting aid contacting the ground surface and moving across the ground surface in a non-supporting position.
Figure 10B:
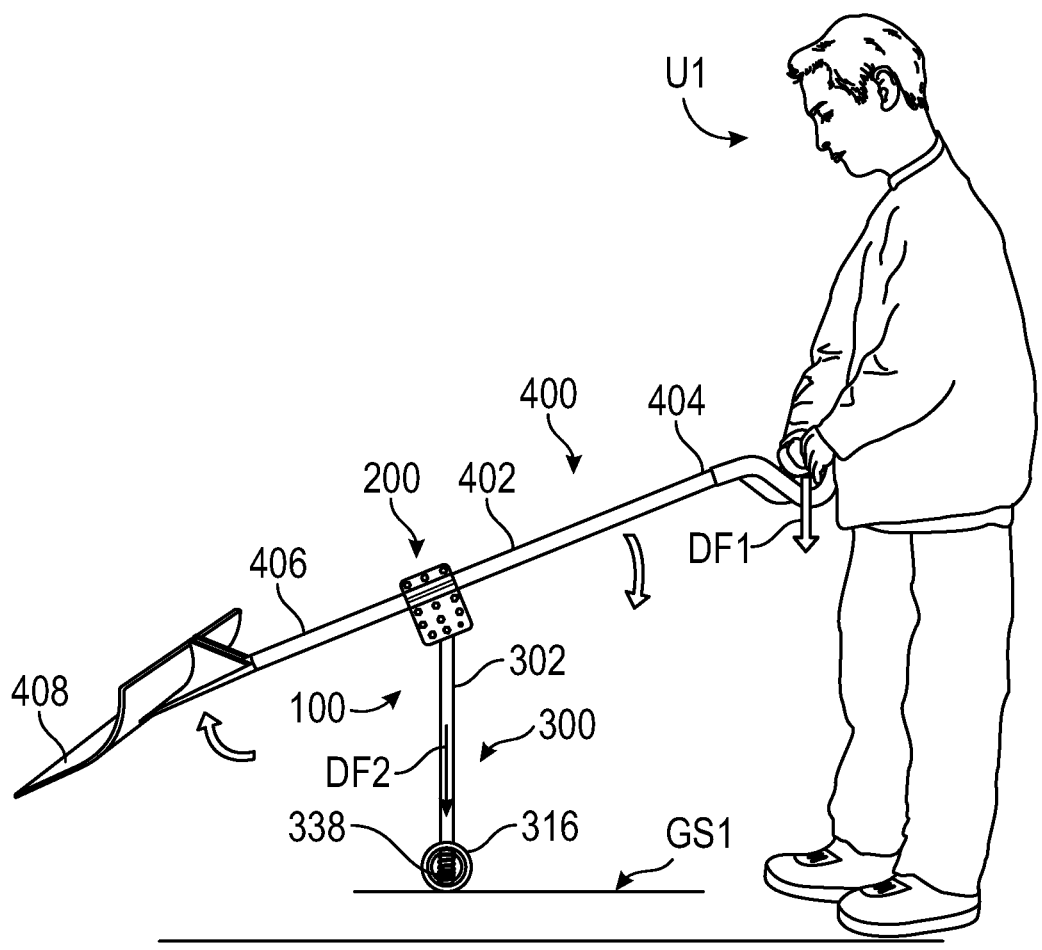
FIG. 10B is a left-side view of the long-handled implement and lifting aid shown in at least FIGS. 9 and 10A, illustrating the user applying a downward force to an upper part of the elongated portion of the long-handled implement, and further illustrating the fulcrum assembly of the lifting aid contacting the ground surface in a substantially upright fulcrum position, and at least a lower part of the long-handled implement lifted generally upwardly away from the ground surface.
Figure 11:
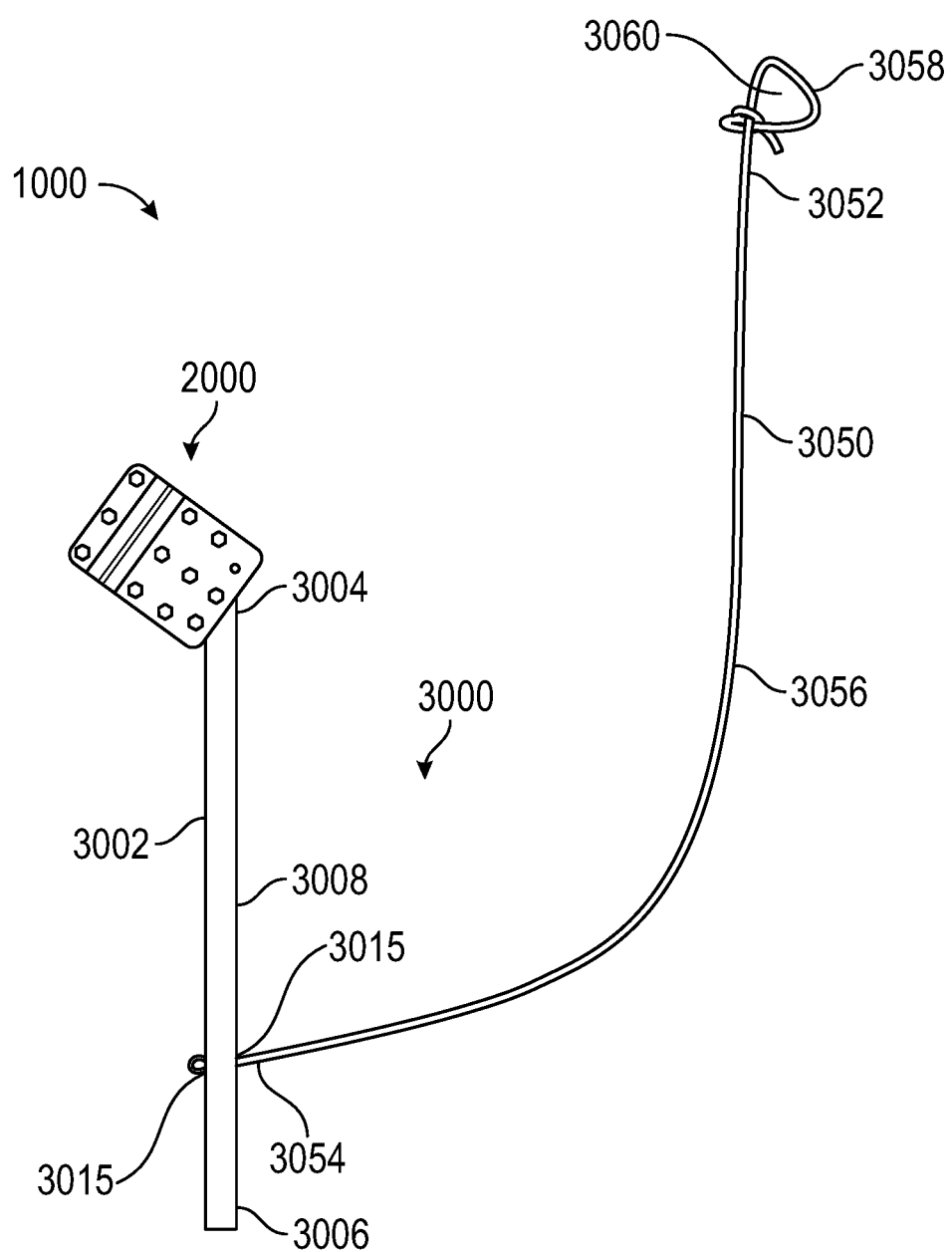
FIG. 11 is a left-side view of another exemplary lifting aid for a long-handled implement.

Referring to at least FIGS. 9, 10A and 10B, the use of the lifting aid 100 when attached to a long-handled implement, such as the long-handled implement 400, will now be described in further detail. More specifically, the lifting aid 100 may be attached to the long-handled implement 400, such as by way of attaching the mounting assembly 200 of the lifting aid 100 to the elongated portion 402 of the long-handled implement 400 (e.g., in a manner as previously described herein). For purposes of simplicity and clarity of the detailed description, the exemplary skid shield 316 of the fulcrum assembly 300 of the lifting aid 100 is shown in at least FIGS. 9, 10A and 10B, however, it is to be understood that the alternative exemplary skid shield 316' and the further alternative exemplary first and second skid shields 316A", 316B" of the fulcrum assembly 300 of the lifting aid 100, as previously described herein, may be shown in the same manner as the skid shield 316 is shown in FIGS. 9, 10A and 10B. As such, the skid shield 316' and the first and second skid shields 316A", 316B" of the fulcrum assembly 300 will also be further referenced and described herein with regard to at least FIGS. 9, 10A and 10B, as may be understood by one skilled in the art.

As shown particularly in FIG. 9, in this example, the fulcrum assembly 300 of the lifting aid 100 may be in a stopped, substantially upright supporting position (e.g., at a time when the long-handled implement 400 is stationary and ready for use but is not yet being handled and/or moved by a user U1), as will be further described herein. In the stopped, substantially upright supporting position, the skid shield 316, the skid shield 316' and the first and second skid shields 316A", 316B" of the fulcrum assembly 300 are each capable of contacting a ground surface GS1. The ground surface GS1 may be at least partially or fully disposed beneath the long-handled implement 400 during use. Furthermore, depending on such factors as the particular type of long-handled implement being used, and the particular intended purpose, the ground surface GS1 may be, for example, asphalt, concrete, gravel, stone, soil, sand, wood, grass, ground surfaces covered in snow and/or ice, etc., as may be understood by one skilled in the art. In this particular example, the long-handled implement 400 may be a long-handled snow shovel, and as such, the ground surface GS1 (e.g., the ground surface of an asphalt, concrete or gravel driveway or walkway) may be covered in snow and/or ice during use of the long-handled implement 400. In other examples, such as when the long-handled implement 400 is a spade (not shown) used for digging, the ground surface may be soil, stone, sand, grass, etc., as may be understood by one skilled in the art.

As further shown in FIG. 9, in the stopped, substantially upright supporting position, the fulcrum bar 302, and thus the fulcrum assembly 300, may be oriented so as to extend substantially upright and may contact the stop 226 of the mounting assembly 200 (e.g., as shown particularly in at least FIG. 2B). Furthermore, while not yet in a substantially upright fulcrum position per se (e.g., so as to function or otherwise serve as a fulcrum, as will be further described herein), the fulcrum bar 302, and thus the fulcrum assembly 300, may be capable of at least generally supporting at least part of the long-handled implement 400 upwardly away from the ground surface GS1 when in the stopped, substantially upright supporting position. As further shown in FIG. 9, when the fulcrum bar 302 of the fulcrum assembly 300 contacts the stop 226 of the mounting assembly 200, an angle α1 may be defined between the longitudinal centerline CL1 of the fulcrum bar 302 and a longitudinal centerline CL2 of the elongated portion 402 of the long-handled implement 400. In this regard, as further shown in FIG. 9, as a non-limiting example, the angle α1 may be an angle which is preferably in a range of about 35° to about 40°, although angles of other magnitudes may be defined between the longitudinal centerline CL1 of the fulcrum bar 302 and the longitudinal centerline CL2 of the elongated portion 402 of the long-handled implement 400, as may be understood by one skilled in the art.

As shown particularly in FIG. 10A, in this example, the user U1 using the long-handled implement 400 (e.g., shoveling snow) may slide or otherwise move (e.g., by pushing and pulling) the long-handled implement 400 generally forwards and backwards across the ground surface GS1. At the same time, depending on the actions of the user U1, the fulcrum bar 302, and thus the fulcrum assembly 300 of the lifting aid 100, may pivot with respect to at least the mounting assembly 200 of the lifting aid 100 generally forwards in the first rotational direction RD1 and generally backwards in a second rotational direction RD2 which is opposite the first rotational direction RD1. Similarly, at the same time, depending on the actions of the user U1, the skid shield 316, the skid shield 316' and the first and second skid shields 316A", 316B" of the fulcrum assembly 300 may contact the ground surface GS1 and may continually move (e.g., slide or otherwise skid) generally forwards and backwards across the ground surface GS1. In this manner, as shown in FIG. 10A, while moving simultaneously along with the long-handled implement 400, the fulcrum assembly 300 may therefore be in a non-supporting position (i.e., the fulcrum assembly 300 being generally non-load bearing) in which the ground surface GS1 and/or the user U1, rather than the fulcrum assembly 300, generally supports at least part of the long-handled implement 400 upwardly away from the ground surface GS1.

Furthermore, given that at least the bottom portion 328 of the main body 318 of the skid shield 316, at least the bottom portion 328' of the main body 318' of the skid shield 316' and at least each of the bottom portions 328A", 328B" of each of the respective main bodies 318A", 318B" of each of the respective first and second skid shields 316A", 316B" may be curved or at least generally curved (e.g., as previously described herein and shown in at least FIGS. 3A-3C, 5A, 5B and 7A-7C), the skid shield 316, the skid shield 316' and the first and second skid shields 316A", 316B" of the fulcrum assembly 300 may advantageously experience less ground surface contact, friction and wear thereon when contacting the ground surface GS1 and may therefore also continually move (e.g., slide or otherwise skid) generally forwards and backwards across the ground surface GS1 more easily, smoothly and efficiently.

Additionally, as shown in FIG. 10A, given that the fulcrum assembly 300 in the non-supporting position is generally non-load bearing, when the skid shield 316, the skid shield 316' and each of the first and second skid shields 316A", 316B" contacts the ground surface GS1 and continually moves generally forwards and backwards across the ground surface GS1, at least the lower part 336 of the bottom portion 328 of the main body 318 of the skid shield 316, at least the lower part 336' of the bottom portion 328' of the main body 318' of the skid shield 316' and at least each of the lower parts 336A", 336B" of each of the respective bottom portions 328A", 328B" of each of the respective main bodies 318A", 318B" of each of the respective first and second skid shields 316A", 316B" may be disposed below, or otherwise at least generally downward of, at least the lowermost part 310 of the lower end portion 306 of the fulcrum bar 302 of the fulcrum assembly 300 (e.g., as shown in FIGS. 3A-3C, 5A, 5B and 7A-7C), thus advantageously preventing at least the lowermost part 310 of the lower end portion 306 of the fulcrum bar 302 from contacting the ground surface GS1. In this regard, it is especially advantageous that at least the lowermost part 310 of the lower end portion 306 of the fulcrum bar 302 be prevented from contacting the ground surface GS1 while the long-handled implement 400 and fulcrum assembly 300 slide or otherwise move generally forwards and backwards across the ground surface GS1, since at this time, the user U1 may not yet desire lifting assistance from the lifting aid 100 and therefore may not yet desire the fulcrum bar 302 of the fulcrum assembly 300 to contact the ground surface GS1 (i.e., since contacting the ground surface GS1 at this time may cause at least the lowermost part 310 of the lower end portion 306 of the fulcrum bar 302 to dig or bite into the ground surface GS1 and thus substantially inhibit the user U1 from sliding or otherwise moving the long-handled implement 400 generally forwards and backwards across the ground surface GS1). Furthermore, in order to protect at least the lowermost part 310 of the lower end portion 306 of the fulcrum bar 302 from experiencing undesirable wear and/or damage while the long-handled implement 400 and fulcrum assembly 300 slide or otherwise move generally forwards and backwards across the ground surface GS1, it is especially advantageous that at least the lowermost part 310 of the lower end portion 306 of the fulcrum bar 302 be prevented from contacting the ground surface GS1 (e.g., by way of the skid shield 316, the skid shield 316' and each of the first and second skid shields 316A", 316B", as previously described herein) while the long-handled implement 400 and fulcrum assembly 300 slide or otherwise move generally forwards and backwards across the ground surface GS1.

In other examples, such as when the long-handled implement 400 employing the lifting aid 100 is a spade (not shown) or crowbar (not shown) being used for digging or prying primarily at a specific location, depending on the actions of the user U1 and the particular manner in which the long-handled implement 400 is used, it is to be understood that the fulcrum assembly 300 of the lifting aid 100 may or may not continually move (e.g., continually slide or otherwise skid) across a ground/support surface disposed at the specific location, but rather, the fulcrum assembly 300, and particularly the skid shield 316, the skid shield 316' and the first and second skid shields 316A", 316B" of the fulcrum assembly 300, may remain substantially stationary when in contact with the ground/support surface disposed at the specific location.

As shown particularly in FIG. 10B, during use of the long-handled implement 400 (e.g., while shoveling snow), when the user U1 desires lifting assistance from the lifting aid 100 (e.g., assistance with lifting the long-handled implement 400 so as to throw, push or otherwise displace the shoveled/collected snow to a desired location), the fulcrum assembly 300 of the lifting aid 100 may be pivoted from the non-supporting position (e.g., as shown in FIG. 10A), as previously described herein, to a substantially upright fulcrum position in which the fulcrum assembly 300 is advantageously capable of functioning or otherwise serving as a fulcrum. During the transition between the non-supporting position (e.g., as shown in FIG. 10A) and the substantially upright fulcrum position (e.g., as shown in FIG. 10B), the fulcrum bar 302 of the fulcrum assembly 300 may pivot generally forwards in the first rotational direction RD1 with respect to at least the mounting assembly 200 (e.g., which may be initiated by the user U1 lifting at least an upper part 404 of the elongated portion 402 of the long-handled implement 400), but not further beyond or otherwise past the stop 226 of the mounting assembly 200. More specifically, if and when the fulcrum bar 302 of the fulcrum assembly 300 contacts the stop 226 of the mounting assembly 200, the stop 226 is advantageously capable of preventing the fulcrum bar 302 from further pivoting in the first rotational direction RD1 beyond or otherwise past the stop 226 (i.e., which, if permitted, may be disadvantageous for the user U1 since the fulcrum bar 302, and thus the fulcrum assembly 300, may then be oriented too far forward during the transition between the non-supporting position and the substantially upright fulcrum position). In this manner, the stop 226 of the mounting assembly 200 may further advantageously ensure that the fulcrum bar 302, and thus the fulcrum assembly 300, is capable of being oriented in an optimal, substantially upright position, particularly with respect to at least the long-handled implement 400 and the ground surface GS1, during the transition between the non-supporting position (e.g., as shown in FIG. 10A) and the substantially upright fulcrum position (e.g., as shown in FIG. 10B).

With further reference to FIG. 10B, the further transitioning of the fulcrum assembly 300 into the substantially upright fulcrum position (i.e., during which lifting assistance is provided to the user U1 by way of the lifting aid 100) will now be further described herein and with particular reference to the exemplary skid shield 316, the alternative exemplary skid shield 316' and the further alternative exemplary first and second skid shields 316A", 316B" of the fulcrum assembly 300 of the lifting aid 100.

Figure 4B:
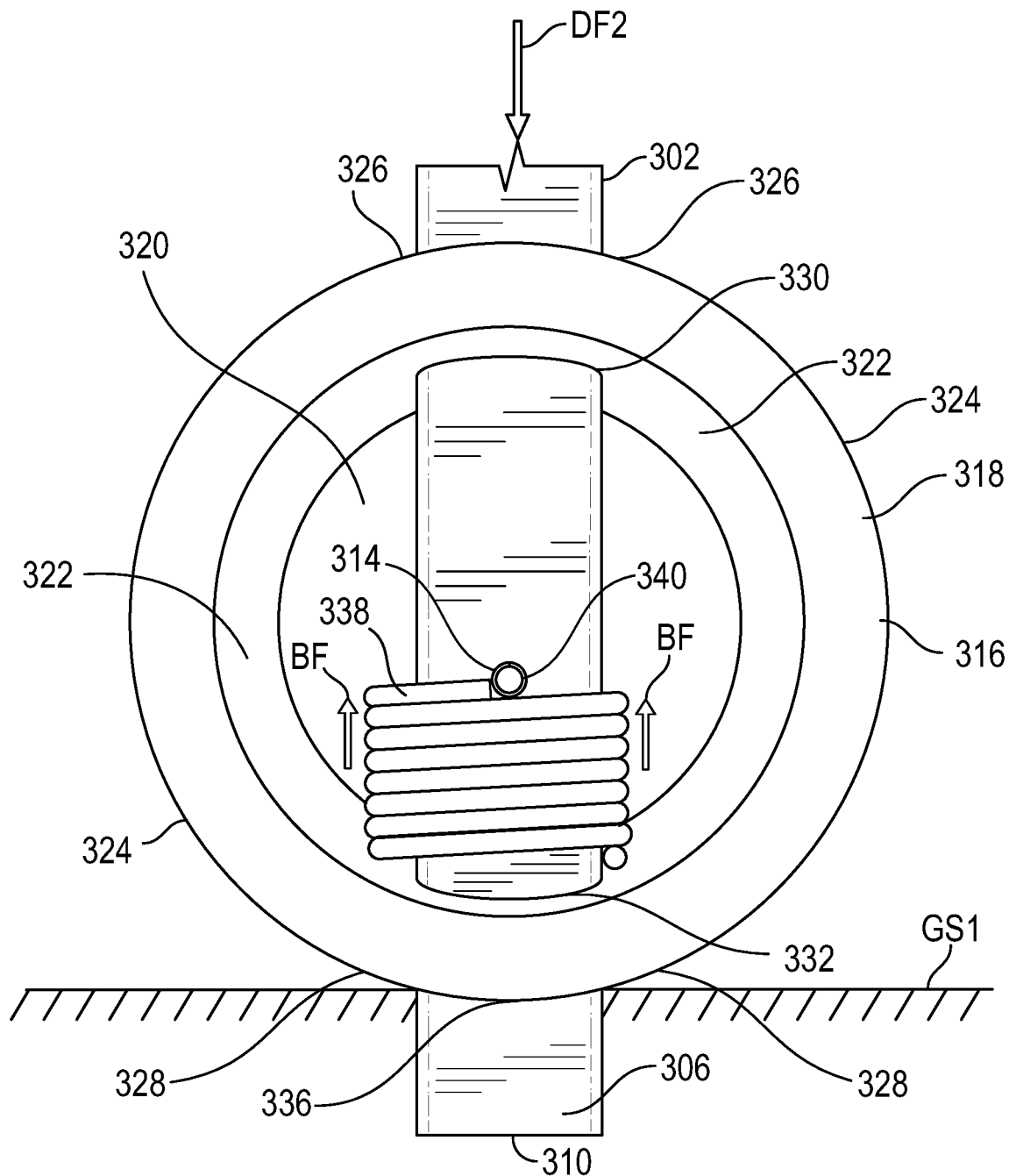
FIG. 4B is a left-side view of the skid shield shown in at least FIGS. 3A-3C and FIG. 4A, further illustrating the skid shield contacting, and being supported by, a ground surface, and further illustrating the fulcrum bar in a fully downward position, with respect to at least the supported skid shield, and contacting the ground surface.

With further reference to FIG. 10B, regarding the skid shield 316 of the fulcrum assembly 300, when the skid shield 316 contacts the ground surface GS1 (e.g., when the fulcrum assembly 300 is pivoted so as to be in the optimal, substantially upright position, as previously described herein) and a downward force DF1 exceeding a certain amount is applied by the user U1 to at least the upper part 404 of the elongated portion 402 of the long-handled implement 400 (i.e., the downward force DF1 applied by the user U1 being at least a sufficient amount to initiate downward movement of at least the upper part 404 of the elongated portion 402 of the long-handled implement 400, as may be understood by one skilled in the art), (i) at least the lowermost part 310 of the lower end portion 306 of the fulcrum bar 302 of the fulcrum assembly 300 moves downwardly, with respect to at least the lower part 336 of the bottom portion 328 of the main body 318 of the skid shield 316 (e.g., when the main body 318 of the skid shield 316 is supported on the ground surface GS1 and a downward force DF2 exerted on the fulcrum bar 302 exceeds the biasing force BF of the biasing member 338 of the fulcrum assembly 300—as shown in FIG. 4B), such that at least the lowermost part 310 of the lower end portion 306 of the fulcrum bar 302 is disposed outside of (i.e., below) the bottom opening 332 formed in the bottom portion 328 of the main body 318 of the skid shield 316 and contacts the ground surface GS1 (e.g., as shown in FIG. 4B) and (ii) at least a lower part 406 of the elongated portion 402 of the long-handled implement 400 pivots generally upwardly, with respect to at least the fulcrum assembly 300, thereby lifting at least a lower part 408 (e.g., a shovel blade) of the long-handled implement 400 generally upwardly away from the ground surface GS1 and advantageously assisting the user U1.

With further regard to at least the fulcrum bar 302, the skid shield 316 and the biasing member 338 of the fulcrum assembly 300 of the lifting aid 100, when the fulcrum assembly 300 is in the substantially upright fulcrum position (e.g., as shown in FIG. 10B) and assisting the user U1 with lifting the long-handled implement 400, as previously described herein, it is to be understood that the biasing member 338 (e.g., which may be a compression spring) may be fully compressed (e.g., as shown in FIG. 4B) or may be partially compressed when at least the lowermost part 310 of the lower end portion 306 of the fulcrum bar 302 is disposed outside of (i.e., below) the bottom opening 332 formed in the bottom portion 328 of the main body 318 of the skid shield 316 and contacts the ground surface GS1 (e.g., as shown in FIG. 4B). More specifically, the extent of which the biasing member 338 compresses may depend on such factors as the amount of downward force DF2 which is exerted on the fulcrum bar 302 and the hardness of the particular ground surface GS1 on which the skid shield 316 is supported and which at least the lowermost part 310 of the lower end portion 306 of the fulcrum bar 302 contacts. For example, when at least the lowermost part 310 of the lower end portion 306 of the fulcrum bar 302 contacts a relatively hard ground surface GS1 (e.g., concrete, asphalt, compacted soil or clay, a ground surface covered in compacted snow and/or ice, etc.), at least the lowermost part 310 of the lower end portion 306 of the fulcrum bar 302 may be disposed to a lesser extent outside of (i.e., below) the bottom opening 332 formed in the bottom portion 328 of the main body 318 of the skid shield 316, thus resulting in the biasing member 338 being compressed to a lesser extent (i.e., being partially compressed). Alternatively, for example, when at least the lowermost part 310 of the lower end portion 306 of the fulcrum bar 302 contacts a relatively soft ground surface GS1 (e.g., soft soil, loose stone, sand, a ground surface covered in a thick layer of soft or lightly compacted snow, etc.), at least the lowermost part 310 of the lower end portion 306 of the fulcrum bar 302 may be disposed to a greater extent outside of (i.e., below) the bottom opening 332 formed in the bottom portion 328 of the main body 318 of the skid shield 316, thus resulting in the biasing member 338 being compressed to a greater extent, up to the point of being fully compressed, as shown in FIG. 4B. When the biasing member 338 is fully compressed, the biasing member 338 is advantageously capable of functioning or otherwise serving as a high load-bearing, structural component of the fulcrum assembly 300, and may therefore withstand a relatively high amount of downward force DF2 which may be exerted on the fulcrum bar 302 and further distributed to the fully compressed biasing member 338 and to the bottom portion 328 of the main body 318 of the skid shield 316 which is supported on the ground surface GS1. As such, the biasing member 338 being capable of functioning or otherwise serving as a high load-bearing, structural component of the fulcrum assembly 300 enables the fulcrum assembly 300, including at least the skid shield 316 thereof, to withstand higher loads when assisting the user U1 with lifting the long-handled implement 400. In this regard, when the biasing member 338 is fully compressed and functions or otherwise serves as a high load-bearing, structural component of the fulcrum assembly 300, at least the lowermost part 310 of the lower end portion 306 of the fulcrum bar 302 may be disposed to a maximum extent outside of (i.e., below) the bottom opening 332 formed in the bottom portion 328 of the main body 318 of the skid shield 316 and penetrate downwardly into the ground surface GS1, as shown in FIG. 4B. This is especially advantageous when the long-handled implement 400 is a snow shovel or a spade being used by the user U1 on a softer ground surface GS1 (e.g., during snow removal or digging), and may further advantageously stabilize the fulcrum assembly 300 when experiencing higher loads in the substantially upright fulcrum position (e.g., as shown in FIG. 10B), as may be appreciated and understood by one skilled in the art.

Figure 6B:
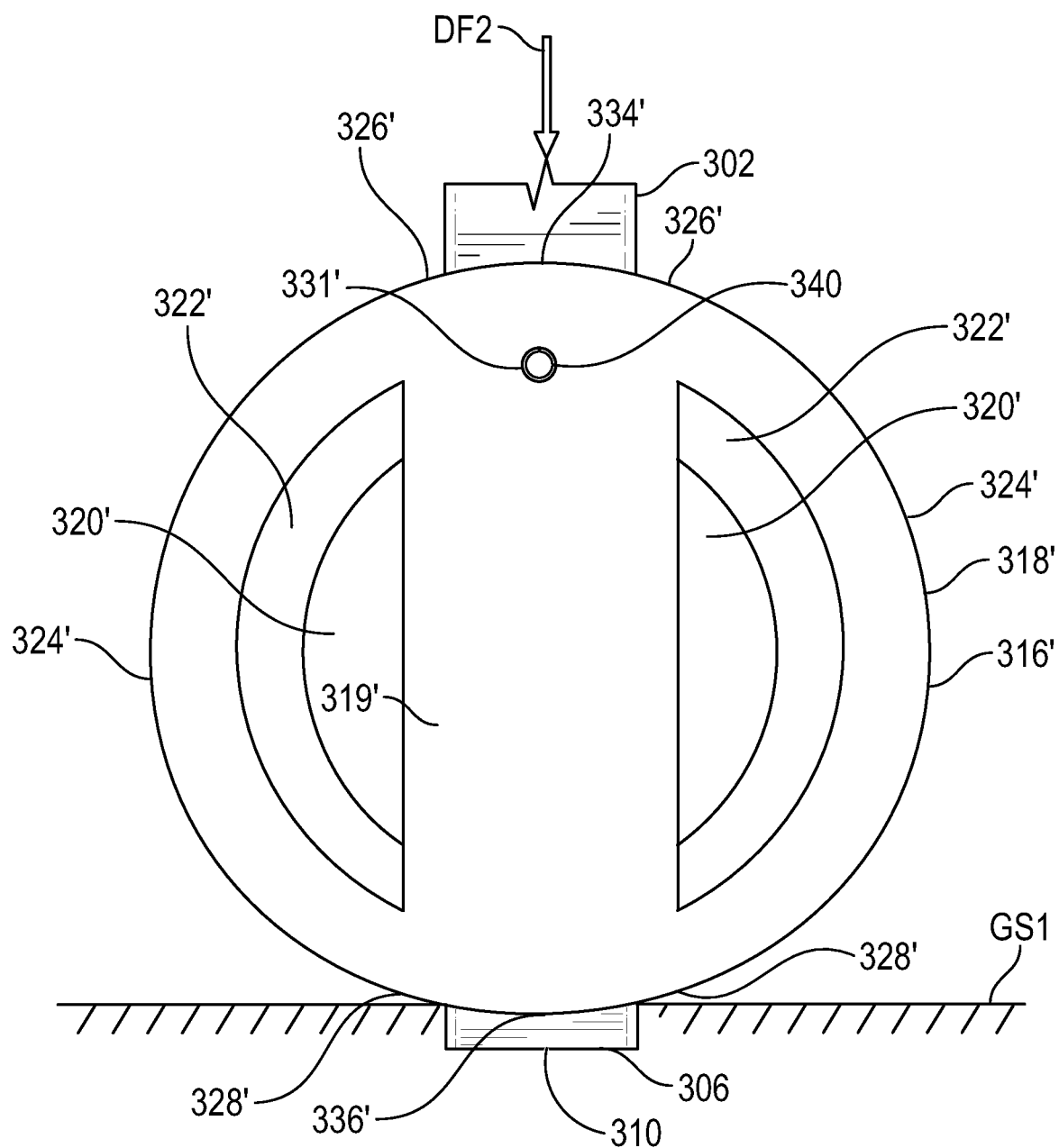
FIG. 6B is a right-side view of the skid shield shown in at least FIGS. 5A, 5B and FIG. 6A, further illustrating the skid shield contacting, and being supported by, a ground surface, and further illustrating the fulcrum bar in a downward position, with respect to at least the supported skid shield, and contacting the ground surface.

With further reference to FIG. 10B, regarding the skid shield 316' of the fulcrum assembly 300, when the skid shield 316' contacts the ground surface GS1 (e.g., when the fulcrum assembly 300 is pivoted so as to be in the optimal, substantially upright position, as previously described herein) and the downward force DF1 exceeding a certain amount is applied by the user U1 to at least the upper part 404 of the elongated portion 402 of the long-handled implement 400 (i.e., the downward force DF1 applied by the user U1 being at least a sufficient amount to initiate downward movement of at least the upper part 404 of the elongated portion 402 of the long-handled implement 400, as may be understood by one skilled in the art), (i) at least the lowermost part 310 of the lower end portion 306 of the fulcrum bar 302 of the fulcrum assembly 300 moves downwardly, with respect to at least the lower part 336' of the bottom portion 328' of the main body 318' of the skid shield 316' (e.g., when the main body 318' of the skid shield 316' is supported on the ground surface GS1 and the downward force DF2 exerted on the fulcrum bar 302 is sufficient to compress at least the compressible material of the bottom portion 328' and center section 319' of the main body 318' of the skid shield 316'—as shown in FIG. 6B), such that at least the lowermost part 310 of the lower end portion 306 of the fulcrum bar 302 is disposed outside of (i.e., below) the central opening 330' formed in the main body 318' of the skid shield 316' and contacts the ground surface GS1 (e.g., as shown in FIG. 6B) and (ii) at least the lower part 406 of the elongated portion 402 of the long-handled implement 400 pivots generally upwardly, with respect to at least the fulcrum assembly 300, thereby lifting at least the lower part 408 (e.g., a shovel blade) of the long-handled implement 400 generally upwardly away from the ground surface GS1 and advantageously assisting the user U1.

Figure 8B:
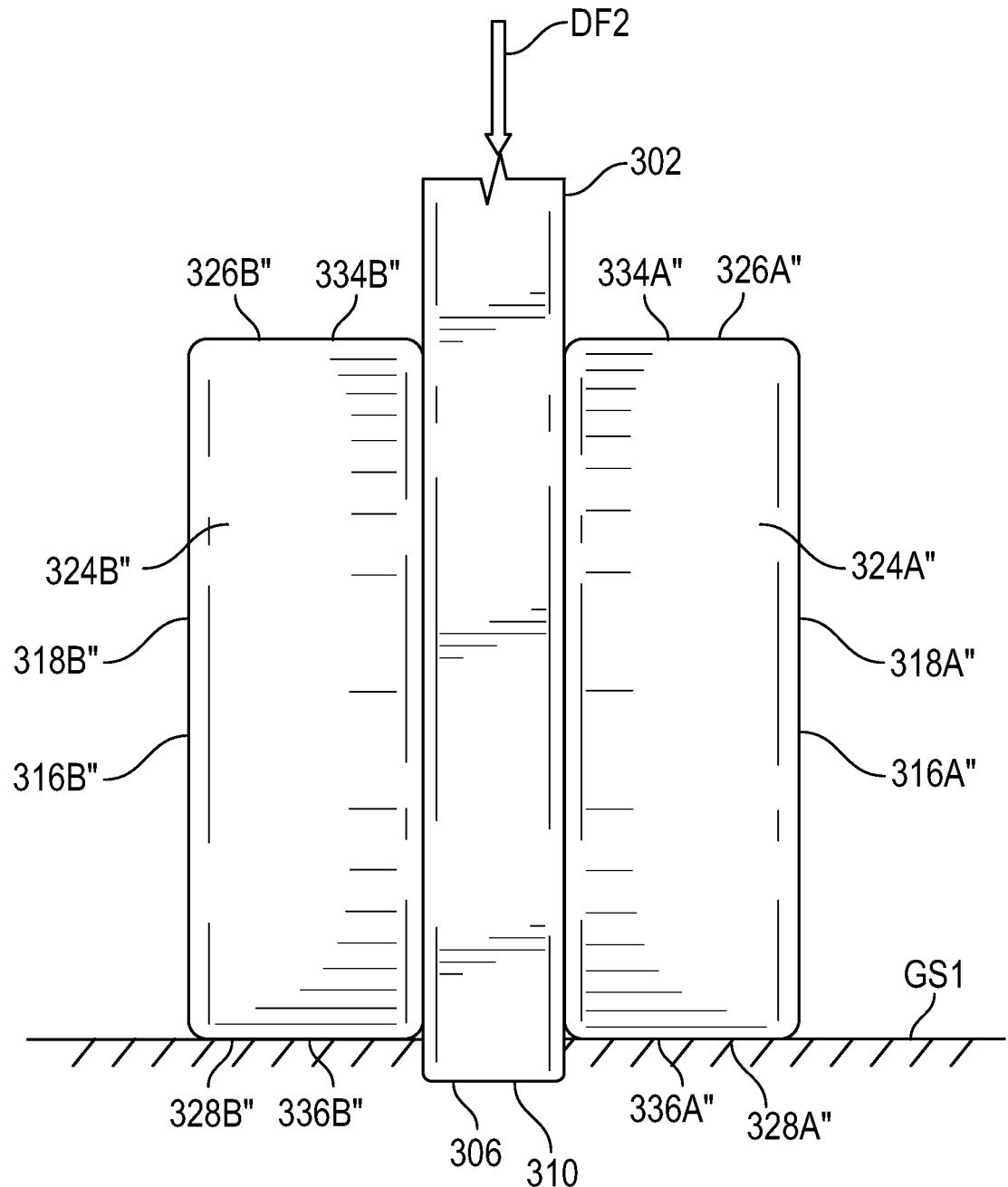
FIG. 8B is a front view of the first and second skid shields shown in at least FIGS. 7A-7C and FIG. 8A, further illustrating the first and second skid shields each contacting, and being supported by, a ground surface, and further illustrating the fulcrum bar in a downward position, with respect to at least the supported first and second skid shields, and contacting the ground surface.

With further reference to FIG. 10B, regarding each of the respective first and second skid shields 316A", 316B" of the fulcrum assembly 300, when each of the respective first and second skid shields 316A", 316B" contact the ground surface GS1 (e.g., when the fulcrum assembly 300 is pivoted so as to be in the optimal, substantially upright position, as previously described herein) and the downward force DF1 exceeding a certain amount is applied by the user U1 to at least the upper part 404 of the elongated portion 402 of the long-handled implement 400 (i.e., the downward force DF1 applied by the user U1 being at least a sufficient amount to initiate downward movement of at least the upper part 404 of the elongated portion 402 of the long-handled implement 400, as may be understood by one skilled in the art), (i) at least the lowermost part 310 of the lower end portion 306 of the fulcrum bar 302 of the fulcrum assembly 300 moves downwardly, with respect to at least each of the respective lower parts 336A", 336B" of each of the respective bottom portions 328A", 328B" of each of the respective main bodies 318A", 318B" of each of the respective first and second skid shields 316A", 316B" (e.g., when each of the respective main bodies 318A", 318B" of each of the respective first and second skid shields 316A", 316B" are supported on the ground surface GS1 and the downward force DF2 exerted on the fulcrum bar 302 is sufficient to compress at least the compressible material of each of the respective bottom portions 328A", 328B" of each of the respective main bodies 318A", 318B" of each of the respective first and second skid shields 316A", 316B"—as shown in FIG. 8B), such that at least the lowermost part 310 of the lower end portion 306 of the fulcrum bar 302 contacts the ground surface GS1 (e.g., as shown in FIG. 8B) and (ii) at least the lower part 406 of the elongated portion 402 of the long-handled implement 400 pivots generally upwardly, with respect to at least the fulcrum assembly 300, thereby lifting at least the lower part 408 (e.g., a shovel blade) of the long-handled implement 400 generally upwardly away from the ground surface GS1 and advantageously assisting the user U1.

Referring to at least FIGS. 11-14, the lifting aid 1000 and the long-handled implement 4000 are shown. As shown in at least FIGS. 12, 13A, 13B and 14, the long-handled implement 4000 may be a long-handled shovel (e.g., a long-handled snow shovel), however, the long-handled implement 4000 may be any type of long-handled implement such as, but not limited to, various types of long-handled spades, landscaping tools, pitchforks, crowbars/pry bars, etc., as may be understood by one skilled in the art.

As further shown in at least FIGS. 11-14, the lifting aid 1000 may include a mounting assembly 2000 which may be attached to an elongated portion 4002 (e.g., a portion of a handle and/or a shaft) of the long-handled implement 4000. The mounting assembly 2000 may be the same as the mounting assembly 200 of the lifting aid 100, as previously described herein. As such, further specific details regarding the mounting assembly 2000, including at least the attachment thereof to the elongated portion 4002 of the long-handled implement 4000, will not be further described herein given that such specific details have been previously described herein with reference to the mounting assembly 200 of the lifting aid 100.

As further shown in at least FIGS. 11-14, the lifting aid 1000 may further include a fulcrum assembly 3000. The fulcrum assembly 3000 may include a substantially elongated fulcrum bar 3002 having an upper end portion 3004, a lower end portion 3006 disposed opposite the upper end portion 3004 and an intermediate portion 3008 disposed between the upper and lower end portions 3004, 3006. The fulcrum bar 3002 further has a longitudinal centerline CL100 thereof extending through at least the upper end portion 3004, the intermediate portion 3008 and the lower end portion 3006 of the fulcrum bar 3002. The fulcrum bar 3002 may be pivotally attached to the mounting assembly 2000, proximate the upper end portion 3004 of the fulcrum bar 3002, so as to pivotally attach the fulcrum assembly 3000 to the mounting assembly 2000. The fulcrum bar 3002 of the fulcrum assembly 3000 may be the same as the fulcrum bar 302 of the fulcrum assembly 300 of the lifting aid 100, as previously described herein, except that the fulcrum bar 3002 of the fulcrum assembly 3000 may not include the same at least one lower opening 314 formed in, and extending through, the fulcrum bar 302 proximate the lower end portion 306 of the fulcrum bar 302 of the fulcrum assembly 300, as previously described herein with regard to the lifting aid 100. Rather, the fulcrum bar 3002 of the fulcrum assembly 3000 may include at least one lower opening 3015 formed therein, and extending therethrough, proximate the intermediate portion 3008 of the fulcrum bar 3002 or proximate the lower end portion 3006 of the fulcrum bar 3002, as will be further described herein. As such, further specific details regarding the fulcrum bar 3002, including at least the pivotal attachment thereof to the mounting assembly 2000, will not be further described herein given that such specific details have been previously described herein with reference to the fulcrum bar 302 of the fulcrum assembly 300 of the lifting aid 100.

As further shown in FIGS. 11-14, the fulcrum assembly 3000 may further include a substantially elongated flexible member 3050 having an upper end portion 3052, a lower end portion 3054 disposed opposite the upper end portion 3052 of the flexible member 3050 and an intermediate portion 3056 disposed between the upper and lower end portions 3052, 3054 of the flexible member 3050. The lower end portion 3054 of the flexible member 3050 may be attached to the fulcrum bar 3002 of the fulcrum assembly 3000 by way of the lower end portion 3054 of the flexible member 3050 extending through, and being secured in (e.g., with a crimp, fastener, knot, etc.), the at least one lower opening 3015 formed in the fulcrum bar 3002 proximate the intermediate portion 3008 of the fulcrum bar 3002 or proximate the lower end portion 3006 of the fulcrum bar 3002.

Additionally, as further shown in FIGS. 11-14, an overall length of the flexible member 3050 of the fulcrum assembly 3000 may be advantageously greater than an overall length of the fulcrum bar 3002 of the fulcrum assembly 3000. More specifically, with the overall length of the flexible member 3050 being greater than the overall length of the fulcrum bar 3002, and with at least the upper end portion 3052 of the flexible member 3050 advantageously not being attached to the fulcrum bar 3002, the flexible member 3050, including at least the upper end portion 3052 of the flexible member 3050, is advantageously permitted to extend at least substantially away from the fulcrum bar 3002. As such, at least the upper end portion 3052 of the flexible member 3050 is advantageously capable of being grasped by a user U100, standing with a relatively straight posture, at a distance substantially away from the fulcrum bar 3002 of the fulcrum assembly 3000 (e.g., as shown in FIGS. 13A and 13B). In this regard, the upper end portion 3052 of the flexible member 3050 may include a handle portion 3058 (e.g., such as a loop handle portion or other suitable handle portion). The handle portion 3058 may have an opening 3060 extending therethrough capable of receiving at least a part of a hand of the user U100 therein (e.g., as shown in FIGS. 13A and 13B). As such, at least the handle portion 3058, or other portion of the flexible member 3050, is advantageously capable of being grasped and moved by the user U100 so as to pivot the fulcrum bar 3002 of the fulcrum assembly 3000 with respect to at least the mounting assembly 2000 (e.g., as shown in FIGS. 13A and 13B), as will be further described herein. In this regard, the lower end portion 3054 of the flexible member 3050 being attached to the fulcrum bar 3002 proximate the intermediate portion 3008 of the fulcrum bar 3002 or proximate the lower end portion 3006 of the fulcrum bar 3002 is especially advantageous. More specifically, as a result of at least the lower end portion 3054 of the flexible member 3050 being attached to the fulcrum bar 3002 proximate the intermediate portion 3008 of the fulcrum bar 3002 or proximate the lower end portion 3006 of the fulcrum bar 3002, at least the fulcrum bar 3002 is advantageously capable of pivoting with respect to at least the mounting assembly 2000 in a sufficiently leveraged, operable manner (e.g., as shown in FIG. 13A) when the user U100 grasps and moves at least the handle portion 3058, or other portion, of the flexible member 3050. Furthermore, in this regard, as may be understood by one skilled in the art, if the lower end portion 3054 of the flexible member 3050 were to be attached to the fulcrum bar 3002 proximate the upper end portion 3004 of the fulcrum bar 3002, the fulcrum bar 3002 may not be capable of pivoting with respect to at least the mounting assembly 2000 in the sufficiently leveraged, operable manner (i.e., which may be disadvantageous to the user U100) when the user U100 grasps and moves at least the handle portion 3058, or other portion, of the flexible member 3050.

With further regard to the flexible member 3050 of the fulcrum assembly 3000, as a non-limiting example, the flexible member 3050 may comprise one of a wire, a cable, a string, a rope, a cord, a strap and a chain, made from any suitable material, however, other suitable flexible members may be employed, as may be understood by one skilled in the art.

Referring to at least FIGS. 12, 13A, 13B and 14, the use of the lifting aid 1000 when attached to a long-handled implement, such as the long-handled implement 4000, will now be described in further detail. More specifically, the lifting aid 1000 may be attached to the long-handled implement 4000, such as by way of attaching the mounting assembly 2000 of the lifting aid 1000 to the elongated portion 4002 of the long-handled implement 4000 (e.g., in a manner as previously described herein).

Figure 12:
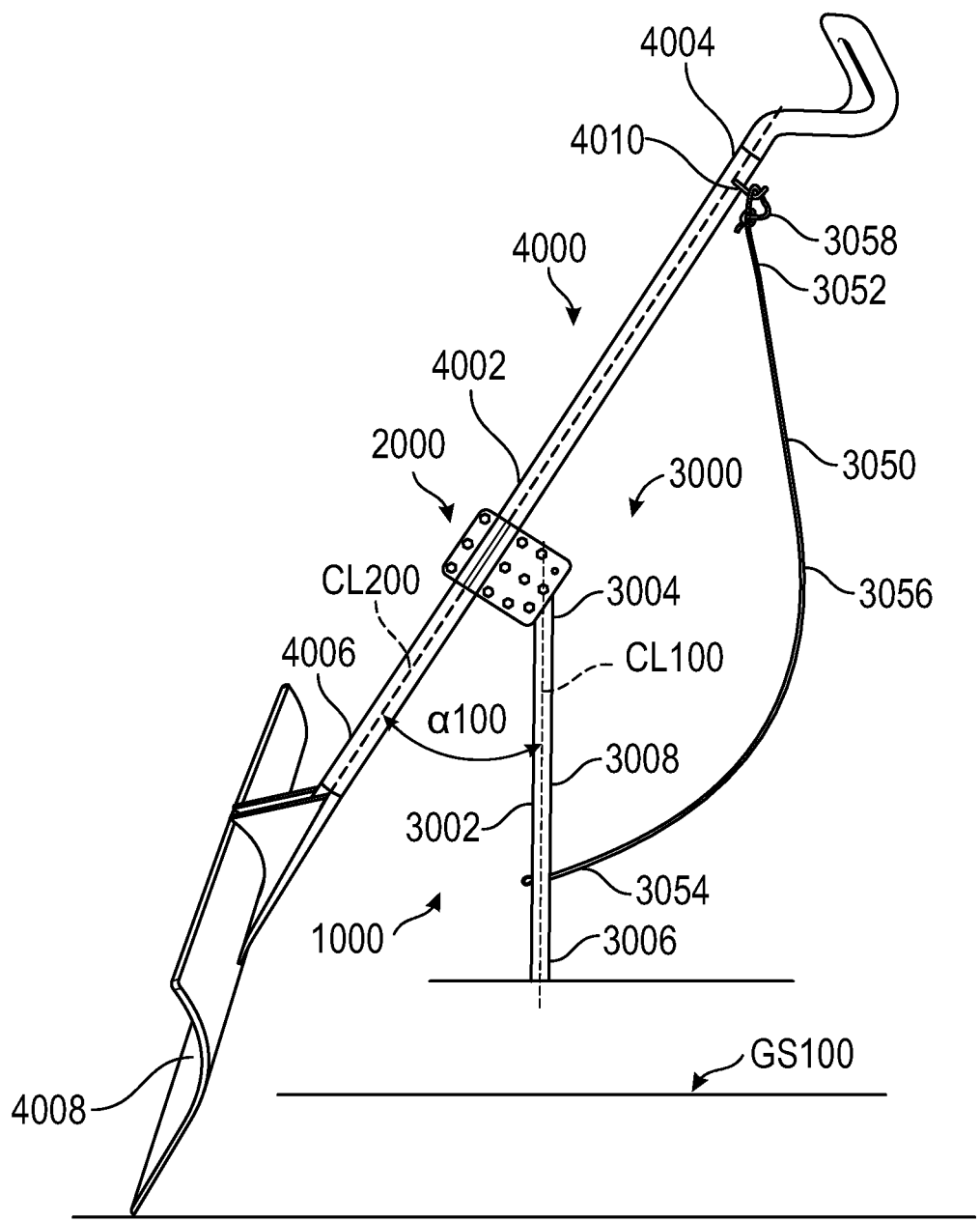
FIG. 12 is a left-side view of an exemplary long-handled implement, illustrating the lifting aid shown in FIG. 11 attached to an elongated portion of the long-handled implement, and further illustrating the fulcrum assembly of the lifting aid contacting a ground surface in a stopped, substantially upright supporting position.

As shown particularly in FIG. 12, the fulcrum assembly 3000 of the lifting aid 1000 may be in a stopped, substantially upright supporting position, (e.g., at a time when the long-handled implement 4000 is stationary and ready for use but is not yet being handled and/or moved by the user U100), as will be further described herein. In the stopped, substantially upright supporting position, the lower end portion 3006 of the fulcrum bar 3002 of the fulcrum assembly 3000 is capable of contacting a ground surface GS100. The ground surface GS100 may be at least partially or fully disposed beneath the long-handled implement 4000 during use. Furthermore, depending on such factors as the particular type of long-handled implement being used, and the particular intended purpose, the ground surface GS100 may be, for example, asphalt, concrete, gravel, stone, soil, sand, wood, grass, ground surfaces covered in snow and/or ice, etc., as may be understood by one skilled in the art. In this particular example, the long-handled implement 4000 may be a long-handled snow shovel, and as such, the ground surface GS100 (e.g., the ground surface of an asphalt, concrete or gravel driveway or walkway) may be covered in snow and/or ice during use of the long-handled implement 4000. In other examples, such as when the long-handled implement 4000 is a spade (not shown) used for digging, the ground surface may be soil, stone, sand, grass, etc., as may be understood by one skilled in the art.

As further shown in FIG. 12, in the stopped, substantially upright supporting position, the fulcrum bar 3002, and thus the fulcrum assembly 3000, may be oriented so as to extend substantially upright and may contact a stop (i.e., the same as the stop 226 of the mounting assembly 200 of the lifting aid 100 shown in FIG. 2B) of the mounting assembly 2000. Furthermore, while not yet in a substantially upright fulcrum position per se (e.g., so as to function or otherwise serve as a fulcrum, as will be further described herein), the fulcrum bar 3002, and thus the fulcrum assembly 3000, may be capable of at least generally supporting at least part of the long-handled implement 4000 upwardly away from the ground surface GS100 when in the stopped, substantially upright supporting position. As further shown in FIG. 12, when the fulcrum bar 3002 of the fulcrum assembly 3000 contacts the stop (i.e., the same as the stop 226 of the mounting assembly 200 of the lifting aid 100 shown in FIG. 2B) of the mounting assembly 2000, an angle α100 may be defined between the longitudinal centerline CL100 of the fulcrum bar 3002 and a longitudinal centerline CL200 of the elongated portion 4002 of the long-handled implement 4000. In this regard, as further shown in FIG. 12, as a non-limiting example, the angle α100 may be an angle which is preferably in a range of about 35° to about 40°, although angles of other magnitudes may be defined between the longitudinal centerline CL100 of the fulcrum bar 3002 and the longitudinal centerline CL200 of the elongated portion 4002 of the long-handled implement 4000, as may be understood by one skilled in the art.

Figure 14:
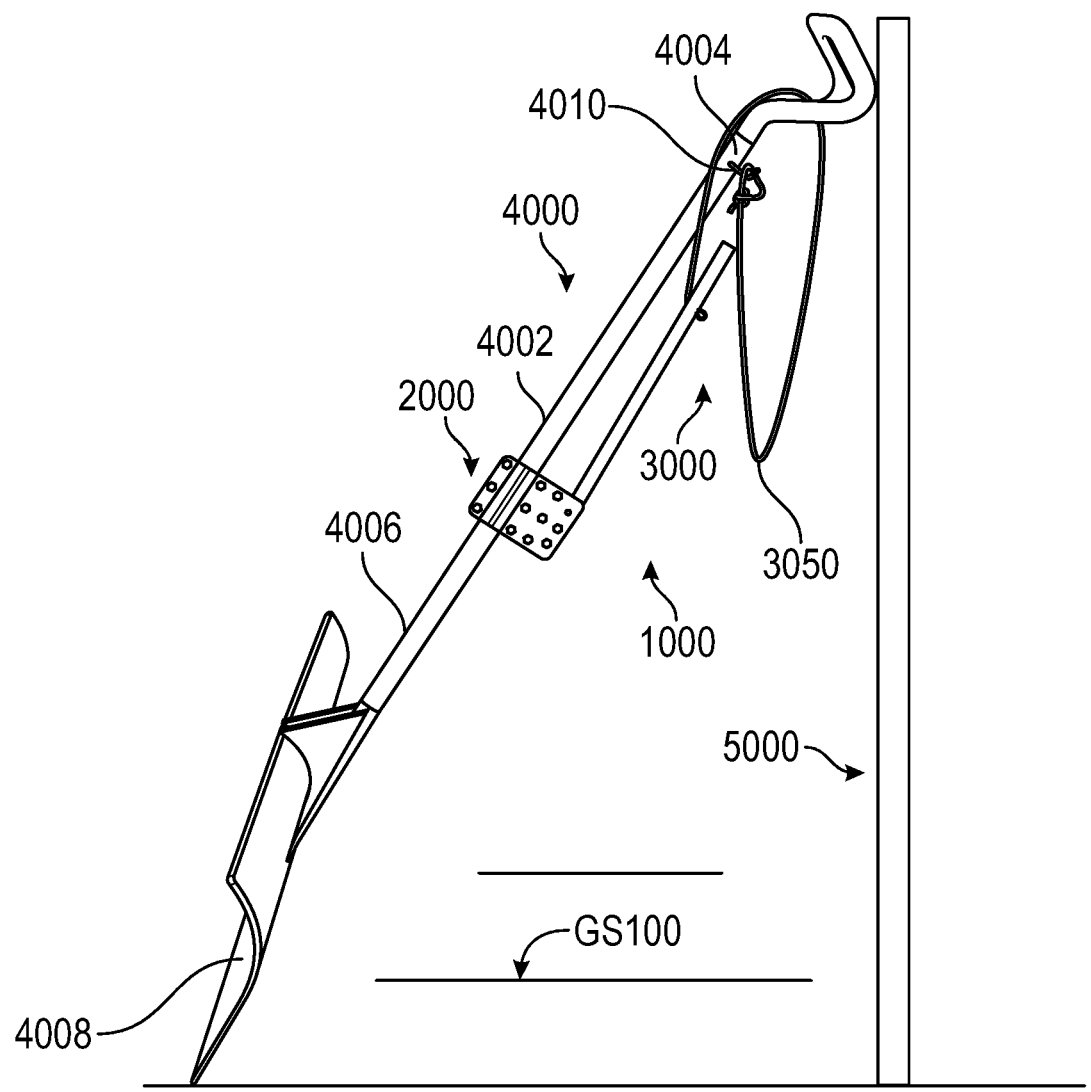
FIG. 14 is a left-side view of the long-handled implement and lifting aid shown in at least FIGS. 12, 13A and 13B, illustrating the long-handled implement and lifting aid when not in use.

As further shown in FIG. 12, and also in FIG. 14, the upper end portion 3052 of the flexible member 3050 of the fulcrum assembly 3000, including at least the handle portion 3058 of the upper end portion 3052 of the flexible member 3050, is capable of being removably attached to the elongated portion 4002 of the long-handled implement 4000 by way of a retaining element 4010 (e.g., a hook, a strap, an elastic band, a hook and loop fastener, etc.) when the flexible member 3050 is not being grasped by the user U100 or when otherwise not in use (e.g., when the long-handled implement 4000 and lifting aid 1000 are in a stowed non-use position as shown in FIG. 14).

Figure 13A:
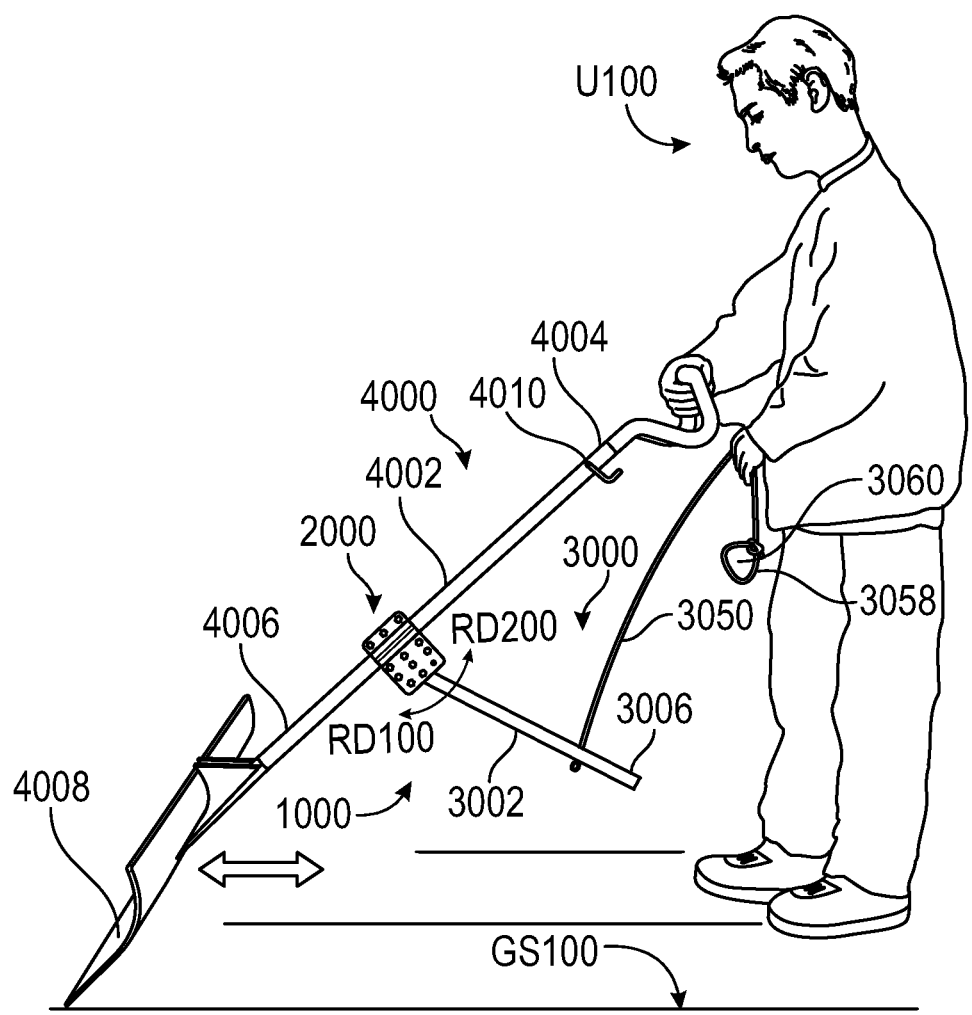
FIG. 13A is a left-side view of the long-handled implement and lifting aid shown in FIG. 12, illustrating a user moving the long-handled implement across the ground surface, and further illustrating the fulcrum assembly of the lifting aid pivoted by the user generally upwardly away from the ground surface, into a non-supporting position.

As shown particularly in FIG. 13A, in this example, the user U100 using the long-handled implement 4000 (e.g., shoveling snow) may slide or otherwise move (e.g., by pushing and pulling) the long-handled implement 4000 generally forwards and backwards across the ground surface GS100. At the same time, the user U100 may pivot the fulcrum bar 3002, and thus the fulcrum assembly 3000, generally downwardly toward the ground surface GS100, and thus generally forwards in a first rotational direction RD100, or generally upwardly away from the ground surface GS100, and thus generally backwards in a second rotational direction RD200, which is opposite the first rotational direction RD100, by grasping and moving (i.e., lowering or raising) at least the handle portion 3058 of the upper portion 3052 of the flexible member 3050 of the fulcrum assembly 3000, or other portion of the flexible member 3050 of the fulcrum assembly 3000. While the user U100 slides or otherwise moves the long-handled implement 4000 generally forwards and backwards across the ground surface GS100, the user U100 may pivot the fulcrum bar 3002, and thus the fulcrum assembly 3000, generally upwardly away from the ground surface GS100, in a manner as previously described herein, such that the fulcrum bar 3002, including at least the lower end portion 3006 of the fulcrum bar 3002, does not contact the ground surface GS100 and is maintained substantially away from (i.e., above) the ground surface GS100. In this regard, the fulcrum assembly 3000 may therefore be maintained in a non-supporting position (i.e., being non-load bearing) in which the ground surface GS100 and/or the user U100, rather than the fulcrum bar 3002 of the fulcrum assembly 3000, generally supports at least part of the long-handled implement 4000 upwardly away from the ground surface GS100. Furthermore, in this regard, it is especially advantageous that at least the lower end portion 3006 of the fulcrum bar 3002 of the fulcrum assembly 3000 be prevented from contacting the ground surface GS100 while the long-handled implement 4000 slides or otherwise moves generally forwards and backwards across the ground surface GS100, since at this time, the user U100 may not yet desire lifting assistance from the lifting aid 1000 and therefore may not yet desire the fulcrum bar 3002 of the fulcrum assembly 3000 to contact the ground surface GS100 (i.e., since contacting the ground surface GS100 at this time may cause at least the lower end portion 3006 of the fulcrum bar 3002 to dig or bite into the ground surface GS100 and thus substantially inhibit the user U100 from sliding or otherwise moving the long-handled implement 4000 generally forwards and backwards across the ground surface GS100). Furthermore, in order to protect at least the lower end portion 3006 of the fulcrum bar 3002 from experiencing undesirable wear and/or damage while the long-handled implement 4000 slides or otherwise moves generally forwards and backwards across the ground surface GS100, it is especially advantageous that at least the lower end portion 3006 of the fulcrum bar 3002 be prevented from contacting the ground surface GS100 while the long-handled implement 4000 slides or otherwise moves generally forwards and backwards across the ground surface GS100.

Figure 13B:
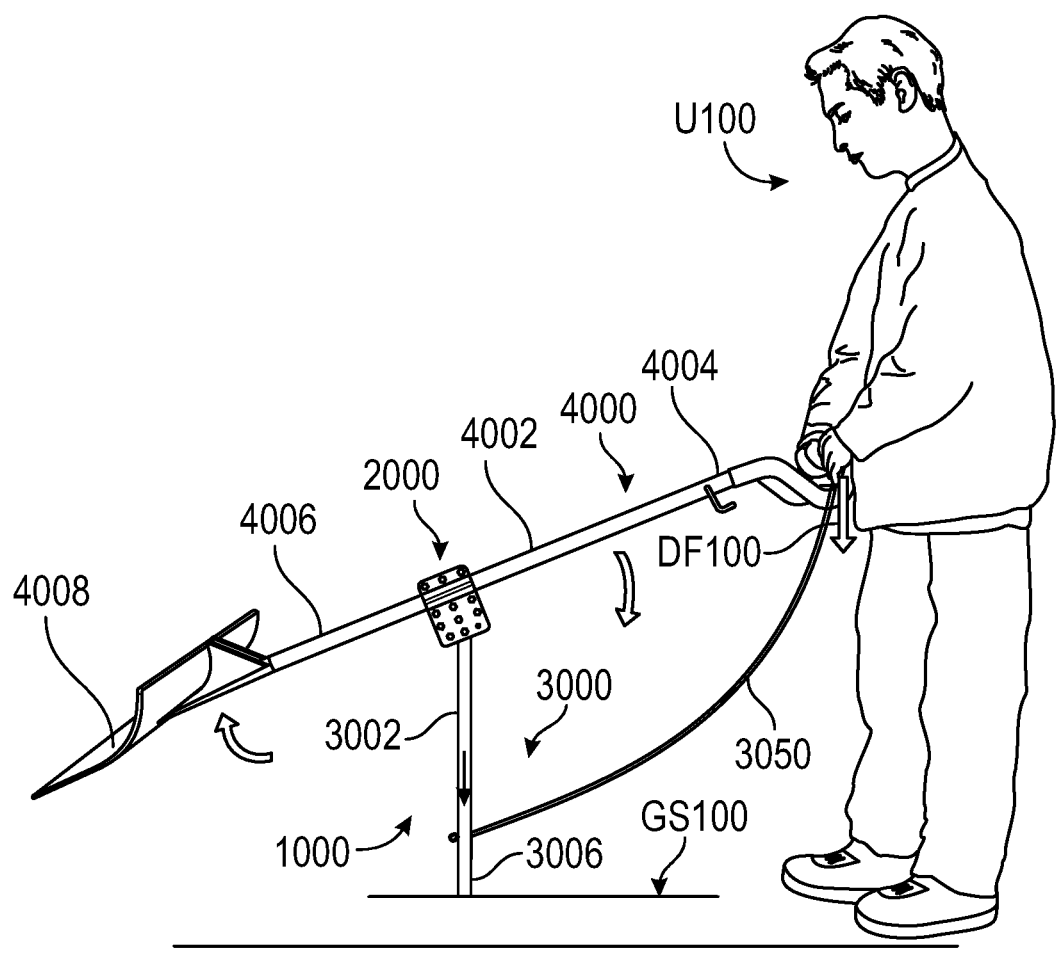
FIG. 13B is a left-side view of the long-handled implement and lifting aid shown in at least FIGS. 12 and 13A, illustrating the user applying a downward force to an upper part of the elongated portion of the long-handled implement, and further illustrating the fulcrum assembly of the lifting aid contacting the ground surface in a substantially upright fulcrum position, and at least a lower part of the long-handled implement lifted generally upwardly away from the ground surface.

As shown particularly in FIG. 13B, during use of the long-handled implement 4000 (e.g., while shoveling snow), when the user U100 desires lifting assistance from the lifting aid 1000 (e.g., assistance with lifting the long-handled implement 4000 so as to throw, push or otherwise displace the shoveled/collected snow to a desired location), the fulcrum assembly 3000 of the lifting aid 1000 may be pivoted by the user U100 from the non-supporting position (e.g., as shown in FIG. 13A), as previously described herein, to a substantially upright fulcrum position in which the fulcrum assembly 3000 is advantageously capable of functioning or otherwise serving as a fulcrum. During the transition between the non-supporting position (e.g., as shown in FIG. 13A) and the substantially upright fulcrum position (e.g., as shown in FIG. 13B), the fulcrum bar 3002 of the fulcrum assembly 3000 may be pivoted by the user U100 generally forwards in the first rotational direction RD100 (i.e., generally downwardly toward the ground surface GS100) with respect to at least the mounting assembly 2000 (e.g., which may be initiated by the user U100 grasping and moving (i.e., lowering) at least the handle portion 3058 of the upper portion 3052 of the flexible member 3050, or other portion of the flexible member 3050, so as to lower the fulcrum bar 3002 of the fulcrum assembly 3000 generally downwardly toward the ground surface GS100, and thus generally forwards in the first rotational direction RD100, while simultaneously lifting at least an upper part 4004 of the elongated portion 4002 of the long-handled implement 4000), but not further beyond or otherwise past the stop (i.e., the same as the stop 226 of the mounting assembly 200 of the lifting aid 100 shown in FIG. 2B) of the mounting assembly 2000. More specifically, if and when the fulcrum bar 3002 of the fulcrum assembly 3000 contacts the stop (i.e., the same as the stop 226 of the mounting assembly 200 of the lifting aid 100 shown in FIG. 2B) of the mounting assembly 2000, the stop is advantageously capable of preventing the fulcrum bar 3002 from further pivoting in the first rotational direction RD100 beyond or otherwise past the stop (i.e., which, if permitted, may be disadvantageous for the user U100 since the fulcrum bar 3002, and thus the fulcrum assembly 3000, may then be oriented too far forward during the transition between the non-supporting position and the substantially upright fulcrum position). In this manner, the stop (i.e., the same as the stop 226 of the mounting assembly 200 of the lifting aid 100 shown in FIG. 2B) of the mounting assembly 2000 may further advantageously ensure that the fulcrum bar 3002, and thus the fulcrum assembly 3000, is capable of being oriented in an optimal, substantially upright position, particularly with respect to at least the long-handled implement 4000 and the ground surface GS100, during the transition between the non-supporting position (e.g., as shown in FIG. 13A) and the substantially upright fulcrum position (e.g., as shown in FIG. 13B).

With further reference to FIG. 13B, the further transitioning of the fulcrum assembly 3000 into the substantially upright fulcrum position (i.e., during which lifting assistance is provided to the user U100 by way of the lifting aid 1000) will now be further described herein. More specifically, when the lower end portion 3006 of the fulcrum bar 3002 of the fulcrum assembly 3000 contacts the ground surface GS100 (e.g., when the fulcrum assembly 3000 is pivoted by the user U100 so as to be in the optimal, substantially upright position, as previously described herein) and a downward force DF100 exceeding a certain amount is applied by the user U100 to at least the upper part 4004 of the elongated portion 4002 of the long-handled implement 4000 (i.e., the downward force DF100 applied by the user U100 being at least a sufficient amount to initiate downward movement of at least the upper part 4004 of the elongated portion 4002 of the long-handled implement 4000, as may be understood by one skilled in the art), at least a lower part 4006 of the elongated portion 4002 of the long-handled implement 4000 pivots generally upwardly, with respect to at least the fulcrum assembly 3000, thereby lifting at least a lower part 4008 (e.g., a shovel blade) of the long-handled implement 4000 generally upwardly away from the ground surface GS100 and advantageously assisting the user U100.

As shown particularly in FIG. 14, the long-handled implement 4000 and the lifting aid 1000 attached thereto may be in a stowed non-use position. In the stowed non-use position, at least the fulcrum bar 3002 and the flexible member 3050 of the fulcrum assembly 3000 may be advantageously placed in a non-use position, such as while the long-handled implement 4000 rests against a stationary object 5000, such as a wall in a storage area, etc. Furthermore, it is to be understood that the long-handled implement 400 and the lifting aid 100, as previously described herein, may be advantageously placed in a similar stowed non-use position while not in use, as may be understood by one skilled in the art.

With further regard to the lifting aid 1000, and particularly to the flexible member 3050 of the fulcrum assembly 3000 of the lifting aid 1000, it is to be understood that such a flexible member 3050 may be implemented on the fulcrum assembly 300 of the lifting aid 100, as previously described herein, so as to further provide a user, such as user U1, with additional control over the pivotal movement and positioning of the fulcrum assembly 300 while using the lifting aid 100, as may be understood by one skilled in the art.

With further regard to the present disclosure, it is to be appreciated that the exemplary lifting aids 100, 1000 for a long-handled implement, such as the exemplary long-handled implements 400, 4000, as previously described herein, are at least relatively simple in design, are relatively light weight, may be advantageously used on various types of long-handled implements and are at least relatively simple to use. Furthermore, the exemplary lifting aids 100, 1000, as previously described herein, are advantageously capable of enabling a user to bend over less and keep a straighter posture while using a long-handled implement. Furthermore, the exemplary lifting aids 100, 1000, as previously described herein, advantageously enable a user to gain additional leverage while using a long-handled implement, such as while shoveling snow with a snow shovel or digging into soil or stone with a spade, thus making it easier for the user to lift or pry the loaded snow shovel or spade generally upwardly so as to throw, push or otherwise displace the snow, soil, stone, etc. to a desired location.

While one or more exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure.

With regard to any processes, systems, methods, heuristics, etc., described herein, it should be understood that, although the steps of such processes, etc., have been described as occurring according to a certain ordered sequence, such processes could be practiced with the described steps performed in an order other than the order described herein. It should be further understood that certain steps could be performed simultaneously, that other steps could be added, or that certain steps described herein could be omitted. In other words, the descriptions of processes described above are provided for the purpose of illustrating certain embodiments, and should in no way be construed so as to limit the claims.

As used in this specification and claims, the terms "for example"/("e.g."), "for instance", "such as", and "like", and the verbs "comprising", "having", "including", and their other verb forms, when used in conjunction with a listing of one or more carriers or other items, are each to be construed as open-ended, meaning that the listing is not to be considered as excluding other, additional carriers or items. Other terms are to be construed using their broadest reasonable meaning unless they are used in a context that requires a different interpretation.

What is claimed is:

1. A lifting aid for a long-handled implement, the lifting aid comprising:
    a mounting assembly configured to be attached to an elongated portion of a long-handled implement; and
    a fulcrum assembly pivotally attached to the mounting assembly, the fulcrum assembly including:
        a fulcrum bar having an upper end portion, a lower end portion disposed opposite the upper end portion and an intermediate portion disposed between the upper and lower end portions, the fulcrum bar further having a longitudinal centerline thereof extending through at least the upper end portion, the intermediate portion and the lower end portion, the fulcrum bar being pivotally attached to the mounting assembly proximate the upper end portion of the fulcrum bar, and
        at least one skid shield operably coupled to the fulcrum bar, proximate the lower end portion of the fulcrum bar, such that (i) at least a bottom portion of the at least one skid shield is disposed adjacent to a lowermost part of the lower end portion of the fulcrum bar and (ii) at least a lower part of the bottom portion of the at least one skid shield is capable of moving, at least in a substantially linear manner, upwardly above the lowermost part of the lower end portion of the fulcrum bar and downwardly below the lowermost part of the lower end portion of the fulcrum bar.

2. The lifting aid according to claim 1, wherein when the lifting aid is attached to the long-handled implement, by way of the mounting assembly being attached to the elongated portion of the long-handled implement, the at least one skid shield of the fulcrum assembly is capable of contacting a ground surface disposed beneath the long-handled implement, and wherein when the at least one skid shield contacts the ground surface and a downward force exceeding a certain amount is applied by a user to at least an upper part of the elongated portion of the long-handled implement, (i) at least the lowermost part of the lower end portion of the fulcrum bar of the fulcrum assembly moves downwardly, with respect to at least the lower part of the bottom portion of the at least one skid shield, such that at least the lowermost part of the lower end portion of the fulcrum bar contacts the ground surface and (ii) at least a lower part of the elongated portion of the long-handled implement pivots generally upwardly, with respect to at least the fulcrum assembly, thereby lifting at least a lower part of the long-handled implement generally upwardly away from the ground surface.

3. The lifting aid according to claim 1, wherein the at least one skid shield of the fulcrum assembly comprises first and second skid shields, wherein the lower part of the bottom portion of each of the first and second skid shields comprises a compressible material, and wherein each of the first and second skid shields are operably coupled to the fulcrum bar of the fulcrum assembly, proximate the lower end portion of the fulcrum bar, such that (i) at least the bottom portion of each of the first and second skid shields is disposed adjacent to the lowermost part of the lower end portion of the fulcrum bar, (ii) at least the compressible material of the bottom portion of each of the first and second skid shields is capable of being compressed upwardly above the lowermost part of the lower end portion of the fulcrum bar and (iii) at least the compressible material of the bottom portion of each of the first and second skid shields is further capable of being decompressed downwardly below the lowermost part of the lower end portion of the fulcrum bar.

4. The lifting aid according to claim 1, wherein the mounting assembly is configured to be removably attached to the elongated portion of the long-handled implement at one of a plurality of different locations disposed along the elongated portion of the long-handled implement.

5. The lifting aid according to claim 1, wherein the mounting assembly is configured to be permanently attached to the elongated portion of the long-handled implement.

6. The lifting aid according to claim 1, wherein the mounting assembly includes a stop capable of being contacted by the fulcrum assembly, and wherein the stop is configured to prevent the fulcrum assembly from pivoting, with respect to at least the mounting assembly, in a first rotational direction when the fulcrum assembly contacts the stop.

7. The lifting aid according to claim 1, wherein the mounting assembly includes a first mounting bracket having a first engagement portion configured to engage the elongated portion of the long-handled implement, a second mounting bracket having a second engagement portion configured to engage the elongated portion of the long-handled implement, the first and second mounting brackets each being further configured to be operably connected to each other such that the first and second engagement portions of the respective first and second mounting brackets are capable of being clamped against the elongated portion of the long-handled implement so as to attach the mounting assembly to the elongated portion of the long-handled implement.

8. A long-handled implement, comprising:
an elongated portion; and
a lifting aid according to claim 1;
wherein the mounting assembly of the lifting aid is attached to the elongated portion of the long-handled implement.

9. The long-handled implement according to claim 8, wherein the long-handled implement is a long-handled shovel.

10. A lifting aid for a long-handled implement, the lifting aid comprising:
a mounting assembly configured to be attached to an elongated portion of a long-handled implement; and
a fulcrum assembly pivotally attached to the mounting assembly, the fulcrum assembly including:
a fulcrum bar having an upper end portion, a lower end portion disposed opposite the upper end portion and an intermediate portion disposed between the upper and lower end portions, the fulcrum bar further having a longitudinal centerline thereof extending through at least the upper end portion, the intermediate portion and the lower end portion, the fulcrum bar being pivotally attached to the mounting assembly proximate the upper end portion of the fulcrum bar, and
a skid shield having an opening formed therein which extends completely through at least a bottom portion of the skid shield, the skid shield being operably coupled to the fulcrum bar, proximate the lower end portion of the fulcrum bar, such that (i) the longitudinal centerline of the fulcrum bar extends through at least the opening formed in the skid shield, (ii) at least a lowermost part of the lower end portion of the fulcrum bar is capable of being disposed within the opening formed in the skid shield and (iii) at least a lower part of the bottom portion of the skid shield is capable of moving, at least along the longitudinal centerline of the fulcrum bar, upwardly and downwardly with respect to at least the lower end portion of the fulcrum bar.

11. The lifting aid according to claim 10, wherein when the lifting aid is attached to the long-handled implement, by way of the mounting assembly being attached to the elongated portion of the long-handled implement, the skid shield of the fulcrum assembly is capable of contacting a ground surface disposed beneath the long-handled implement, and wherein when the skid shield contacts the ground surface and a downward force exceeding a certain amount is applied by a user to at least an upper part of the elongated portion of the long-handled implement, (i) at least the lowermost part of the lower end portion of the fulcrum bar of the fulcrum assembly moves downwardly, with respect to at least the lower part of the bottom portion of the skid shield, such that at least the lowermost part of the lower end portion of the fulcrum bar is disposed outside of the opening formed in the skid shield and contacts the ground surface and (ii) at least a lower part of the elongated portion of the long-handled implement pivots generally upwardly, with respect to at least the fulcrum assembly, thereby lifting at least a lower part of the long-handled implement generally upwardly away from the ground surface.

12. The lifting aid according to claim 10, wherein the fulcrum assembly further includes a biasing member disposed thereon, and wherein the biasing member is configured to bias at least the lower part of the bottom portion of the skid shield downwardly with respect to at least the lowermost part of the lower end portion of the fulcrum bar of the fulcrum assembly.

13. The lifting aid according to claim 12, wherein the biasing member comprises a compression spring or a mass of compressible material.

14. The lifting aid according to claim 10, wherein at least the lower part of the bottom portion of the skid shield comprises a compressible material, and wherein the skid shield is further operably coupled to the fulcrum bar of the fulcrum assembly, proximate the lower end portion of the fulcrum bar, such that (i) at least the compressible material of the bottom portion of the skid shield is capable of being compressed, at least along the longitudinal centerline of the fulcrum bar, upwardly above the lowermost part of the lower end portion of the fulcrum bar such that at least the lowermost part of the lower end portion of the fulcrum bar is disposed outside of the opening formed in the skid shield and (ii) at least the compressible material of the bottom portion of the skid shield is further capable of being decompressed, at least along the longitudinal centerline of the fulcrum bar, downwardly below the lowermost part of the lower end portion of the fulcrum bar such that at least the lowermost part of the lower end portion of the fulcrum bar is disposed within the opening formed in the skid shield.

15. The lifting aid according to claim 10, wherein the mounting assembly is configured to be removably attached to the elongated portion of the long-handled implement at one of a plurality of different locations disposed along the elongated portion of the long-handled implement.

16. The lifting aid according to claim 10, wherein the mounting assembly is configured to be permanently attached to the elongated portion of the long-handled implement.

17. The lifting aid according to claim 10, wherein the mounting assembly includes a stop capable of being contacted by the fulcrum assembly, and wherein the stop is configured to prevent the fulcrum assembly from pivoting, with respect to at least the mounting assembly, in a first rotational direction when the fulcrum assembly contacts the stop.

18. The lifting aid according to claim 10, wherein the mounting assembly includes a first mounting bracket having a first engagement portion configured to engage the elongated portion of the long-handled implement, a second mounting bracket having a second engagement portion configured to engage the elongated portion of the long-handled implement, the first and second mounting brackets each being further configured to be operably connected to each other such that the first and second engagement portions of the respective first and second mounting brackets are capable of being clamped against the elongated portion of the long-handled implement so as to attach the mounting assembly to the elongated portion of the long-handled implement.

19. A long-handled implement, comprising:
an elongated portion; and
a lifting aid according to claim 10;
wherein the mounting assembly of the lifting aid is attached to the elongated portion of the long-handled implement.

20. The long-handled implement according to claim 19, wherein the long-handled implement is a long-handled shovel.

* * * * *